United States Patent [19]

Uekita et al.

[11] Patent Number: 4,822,853

[45] Date of Patent: Apr. 18, 1989

[54] AMPHIPHILIC POLYIMIDE PRECURSOR CONTAINING C12-C30 HYDROPHOBIC GROUPS AND LANGMUIR-BLODGETT FILMS THEREFROM

[75] Inventors: Masakazu Uekita; Hiroshi Awaji, both of Kobe, Japan

[73] Assignee: Kanegafuchi Kagaku Kogyo Kabushiki Kaisha, Osaka, Japan

[21] Appl. No.: 885,666

[22] Filed: Jul. 15, 1986

[30] Foreign Application Priority Data

Jul. 16, 1985 [JP] Japan .................................. 60-157354

[51] Int. Cl.⁴ .................................................. C08G 73/10
[52] U.S. Cl. ............................................ 528/125; 528/128; 528/172; 528/188; 528/220; 528/229; 528/353; 528/352; 428/473.5; 525/436
[58] Field of Search ............... 528/125, 128, 172, 188, 528/220, 229, 352, 353; 428/473.5; 525/436

[56] References Cited

U.S. PATENT DOCUMENTS

| | | | |
|---|---|---|---|
| 3,261,811 | 6/1966 | Tatum | 528/353 |
| 3,282,897 | 11/1966 | Angelo | 528/353 |
| 3,312,663 | 4/1967 | Sorenson | 528/353 |
| 3,316,212 | 4/1967 | Angelo | 528/353 |
| 3,326,851 | 6/1967 | Tocker | 528/353 |
| 3,349,061 | 10/1967 | Pruckmayr | 528/220 |
| 3,376,260 | 4/1968 | Fritz | 528/353 |
| 3,654,227 | 4/1972 | Dine-Hart | 528/353 |
| 4,022,732 | 5/1977 | Schwarcz | 528/353 |

FOREIGN PATENT DOCUMENTS

54-145794 11/1979 Japan .
55-30207 8/1980 Japan .

OTHER PUBLICATIONS

Alan K. Engel, Tomoko Yoden, Kohei Sanui, and Naoya Ogata, J. Am. Chem. Soc. (1985), 107, 8308-8310.

M. Suzuki, M. Kakimoto, T. Konishi, Y. Imai, M. Iwamoto and T. Hino, Chemistry Letters, (1986), 395-398; 823-826.

Alan K. Engel, Tomoko Yoden, Kohei Sanui and Naoya Ogata, Polymeric Materials Science and Engineering, 54, (1986), 119-123.

P. S. Vincett and G. G. Roberts, Thin Solid Films, 68, (1980), 135-171.

Chemical Abstracts, vol. 100, No. 10, 5th Mar. 1984, p. 10, abstract No. 68897m, Columbus, Ohio, U.S.; A. I. Volozhin et al.

Chemical Abstracts, vol. 102, No. 26, 1st Jul. 1985, p. 6, abstract No. 221283w, Columbus, Ohio, U.S.; L. Minnema et al.

Primary Examiner—John Kight
Assistant Examiner—Frederick Krass
Attorney, Agent, or Firm—Armstrong, Nikaido, Marmelstein & Kubovcik

[57] ABSTRACT

An amphiphilic polyimide precursor having at least 70% by mole of the recurring unit of the formula (1):

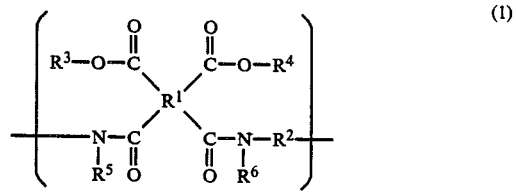

wherein $R^1$ is a tetravalent group having at least 2 carbon atoms, $R^2$ is a bivalent group having at least 2 carbon atoms, and $R^3$, $R^4$, $R^5$ and $R^6$ are hydrogen atoms or a monovalent group having 1 to 30 carbon atoms selected from an aliphatic group, an alicyclic group, an aromatic group, a group in which an aliphatic group is combined with an alicyclic group or an aromatic group, and their groups substituted by a halogen atom, nitro group, amino group, cyano group, methoxy group or acetoxyl group, provided that at least one, preferably at least two, of $R^3$, $R^4$, $R^5$ and $R^6$ are hydrophobic monomolecular groups having 12 to 30 carbon atoms, the polyamide precursor being able to form a built-up film on substrates according to the Langmuir-Blodgett technique and being able to be converted into polyimide by heat treatment to provide an ultrathin film of of polyimide having a thickness of not more than 10,000 Å and excellent heat resistance, chemical resistance, mechanical property and electric characteristics.

20 Claims, 26 Drawing Sheets

AMPHIPHILIC POLYIMIDE PRECURSOR CONTAINING C12-C30 HYDROPHOBIC GROUPS AND LANGMUIR-BLODGETT FILMS THEREFROM

BACKGROUND OF THE INVENTION

The present invention relates to an amphiphilic polyimide precursor and processor for the preparation thereof, and more particularly to an amphiphilic polyimide precursor modified to form a film by the Langmuir-Blodgett technique.

In the 1930s, it was found by Langmuir and Blodgett that a fatty acid having 16 to 22 carbon atoms could form a monolayer (monomolecular film) on the surface of water and the monolayers could be built up on a substrate to form a multilayer film. In recent years, various studies have been made on the applications of the built-up films, namely Langmuir-Blodgett films (hereinafter referred to as "LB film"). The LB films of the straight-chain saturated fatty acids are poor in heat resistance and mechanical strength and are not suitable for practical uses. In order to solve the above problem, there are proposed, for instance, polymerizing films formed from unsaturated fatty acids such as ω-tricosenoic acid, ω-heptadecenoic acid and α-octadecylacrylic acid, or unsaturated fatty acid esters such as vinyl stearate and octadecyl acrylate. However, these films are insufficient in heat resistance and other properties.

On the other hand, it is well known that films of polyimide have excellent heat resistance. The thickness of the films prepared, for instance, by spin coating is at least 1,000 Å, usually 1 μm or more. It is very difficult to form a heat resistant polyimide film with a thickness of less than 1,000 Å and with no pin-hole.

It is an object of the present invention to provide an LB film having improved heat resistance, chemical resistance, mechanical properties such as adhesion and good insulation properties.

A further object of the present invention is to provide a material capable of providing a heat resistant ultrathin film.

A still further object of the present invention is to provide an ultrathin film of polyimides.

These and other objects of the present invention will become apparent from the description hereafter.

SUMMARY OF THE INVENTION

It has now been found that substituent groups for imparting a hydrophobic property to a polyamide acid can be introduced into the polyamide acid, and the monomolecular layer of the so modified polyamide acid having hydrophobic substituent groups is stable on water and can be transferred onto various substrates by the LB technique. It has also been found that ultrathin polyimide films can be produced from the multilayer films of the so modified polyamide acid.

In accordance with the present invention, there is provided an amphiphilic polyimide precursor having the recurring unit of the formula (1):

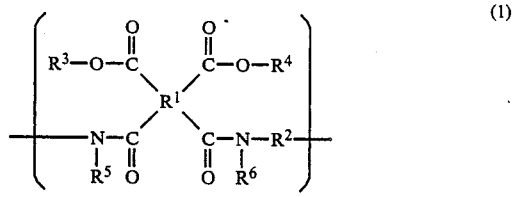

wherein $R^1$ is a tetravalent group having at least 2 carbon atoms, $R^2$ is a bivalent group having at least 2 carbon atoms, and $R^3$, $R^4$, $R^5$ and $R^6$ are hydrogen atom or a monovalent group having 1 to 30 carbon atoms selected from the group consisting of an aliphatic group, an alicyclic group, an aromatic group, a group in which an aliphatic group is combined with an aromatic group or an aliphatic group, and these groups substituted by a halogen atom, nitro group, amino group, cyano group, methoxy group or acetoxyl group, provided that at least one of $R^3$, $R^4$, $R^5$ and $R^6$ is not hydrogen atom and is not the above-mentioned group which has 1 to 11 carbon atoms.

The amphiphilic precursors of polyimides of the present invention are prepared, for instance, by a process in which a tetracarboxylic acid dianhydride of the formula (4):

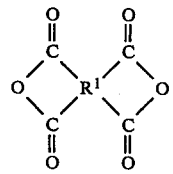

wherein $R^1$ is as defined above, is reacted with $R^3OH$ and $R^4OH$ wherein $R^3$ and $R^4$ are as defined above, the resulting compound of the formula (5):

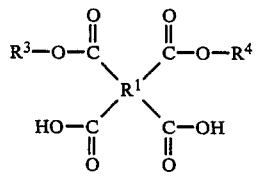

is converted into an acid halide in a substantially anhydrous polar organic solvent at a temperature of not lower than $-10°$ C., and the acid halide is reacted with a compound of the formula (6):

$$R^5-NH-R^2-NH-R^6 \quad (6)$$

wherein $R^2$, $R^5$ and $R^6$ are as defined above, at a temperature of not lower than $-10°$ C. to produce the amphiphilic polyimide precursor (1); or a process in which the tetracarboxylic acid dianhydride (4) is reacted with a compound of the formula (7):

$$R^7-NH-R^2-NH-R^8 \quad (7)$$

wherein $R^2$ is a bivalent group having at least 2 carbon atoms, and $R^7$ and $R^8$ are the same or different and each is a monovalent group having 12 to 30 carbon atoms selected from the group consisting of an aliphatic group, an alicyclic group, an aromatic group, a group in which an aliphatic group is combined with an alicyclic group or an aromatic group, and these groups substituted by a halogen atom, nitro group, amino group, cyano group, methoxy group or acetoxyl group, at a temperature of not higher than 50° C. to produce an amphiphilic polyimide precursor having the recurring unit of the formula (8):

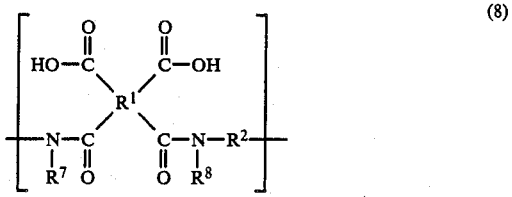

(8)

wherein $R^1$, $R^2$, $R^7$ and $R^8$ are as defined above.

DETAILED DESCRIPTION

Figure 1:
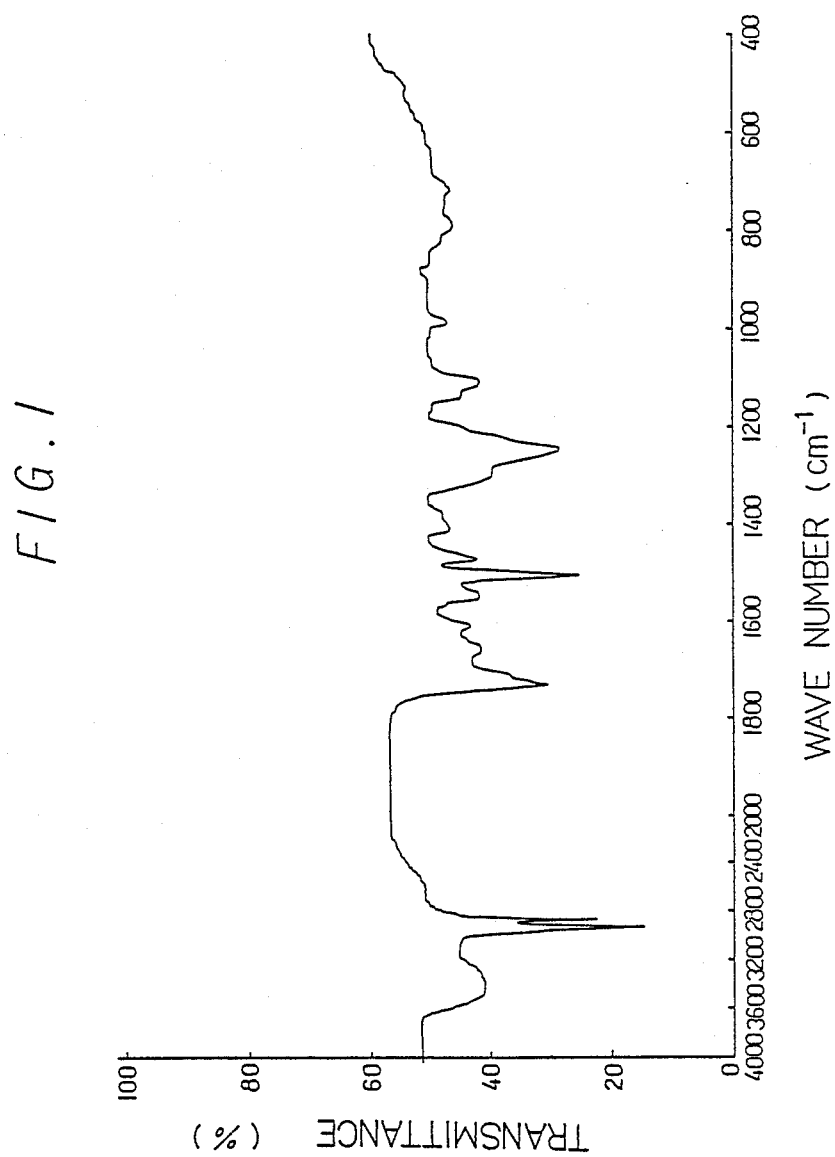
FIG. 1 is an infrared absorption spectrum of the amphiphilic polyimide precursor of the present invention obtained in Example 1 described below.

The amphiphilic polyimide precursors of the present invention are polymeric compounds having the recurring unit of the formula (1):

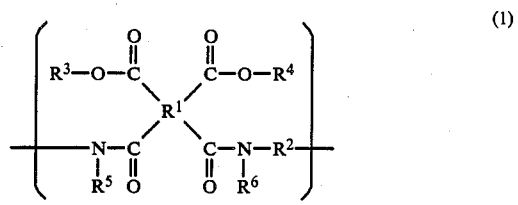

(1)

wherein $R^1$ to $R^6$ are as defined above, and having a number average molecular weight of 2,000 to 300,000, preferably 10,000 to 150,000. When the number average molecular weight is outside the above range, the precursor has a tendency such that the strength of the film prepared therefrom is too low, or the viscosity of a solution thereof is too high and accordingly the procedure for forming LB films becomes difficult.

In the formula (1), $R^1$ is a tetravalent group having at least two carbon atoms, preferably 5 to 20 carbon atoms. It may be an aromatic group; an alicyclic group; an aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like.

Groups characterized by benzenoid unsaturation having at least 6 carbon atoms are preferred as $R^1$ from the viewpoint of heat resistance, chemical resistance and mechanical properties.

Representative examples of the group $R^1$ are, for instance,

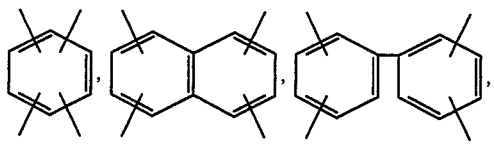

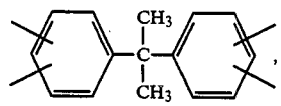

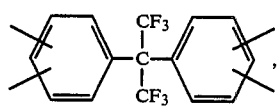

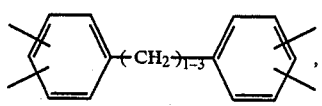

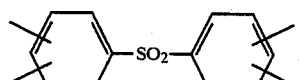

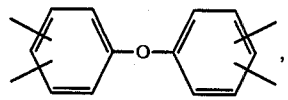

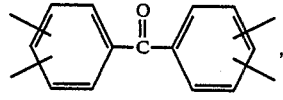

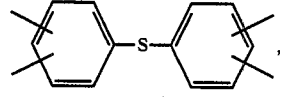

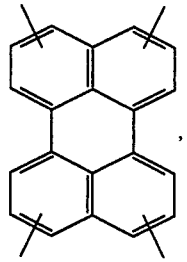 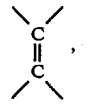

or the like.

The term "benzenoid unsaturation" as used herein is a technical term used in contradistinction to the quinoid structure, as shown below, and means structures identical to those of carbon rings included in usual aromatic compounds.

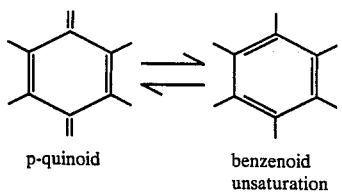

p-quinoid      benzenoid unsaturation

The positions of four bonds of the group $R^1$, that is to say, the positions of the bonds linking $R^3OCO-$, $-COOR^4$, $-NR^5CO-$ and $-CO-NR^6-R^2-$ to $R^1$ in the recurring unit (1), are not particularly limited. However, it is preferable that each two of these four bonds are present at two adjacent carbon atoms constituting the group $R^1$, since a five-membered ring is easily formed when a film formed from the polyimide precursor is imidized.

Preferable examples of the group $R^1$ as mentioned above are, for instance,

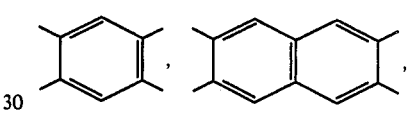

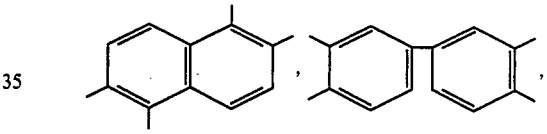

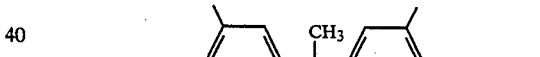

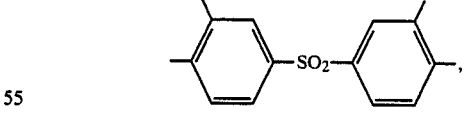

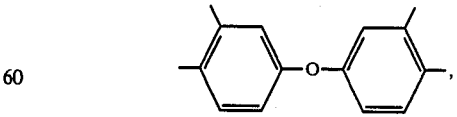

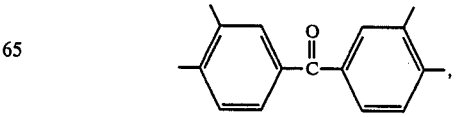

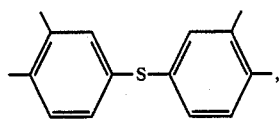 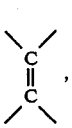 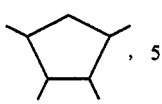

and the like.

The group of the formula:

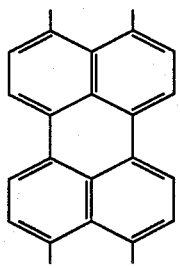

is also preferable as the group R$^1$.

The group R$^2$ in the formula (1) is a bivalent group having at least 2 carbon atoms. It may be an aromatic group; an aliphatic group; an alicyclic group; a group wherein an aromatic group and an aliphatic group are combined; a group wherein each of the above-mentioned bivalent groups is substituted by a monovalent group having 1 to 30 carbon atoms selected from the group consisting of an aliphatic group, an alicyclic group, an aromatic group and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as the group R$^2$ from the viewpoint of heat resistance, chemical resistance and mechanical properties.

Representative examples of the group R$^2$ are, for instance,

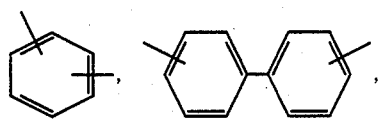 

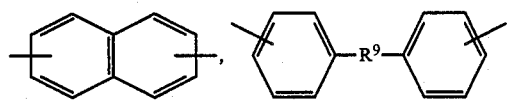

[wherein R$^9$ is

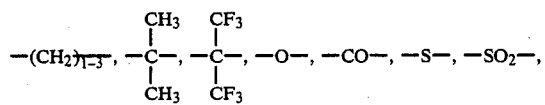

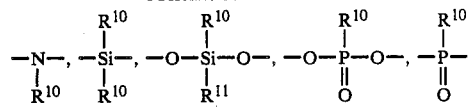

in which R$^{10}$ and R$^{11}$ are an alkyl or aryl group having 1 to 30 carbon atoms],

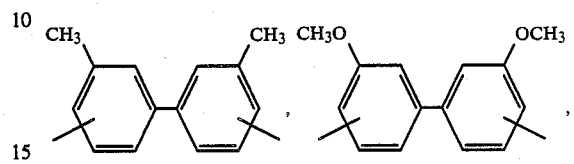

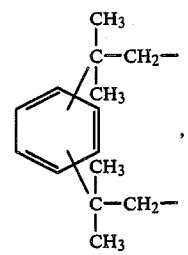

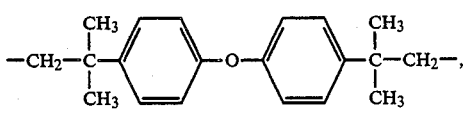

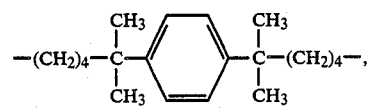

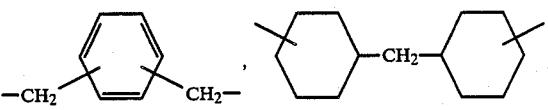

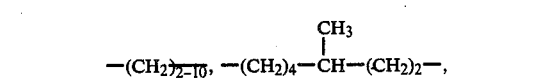

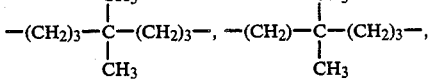

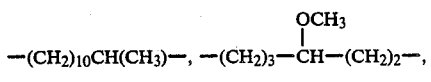

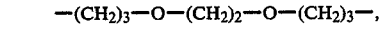

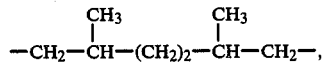

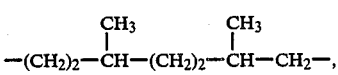

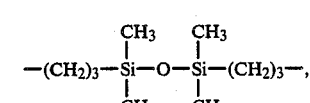

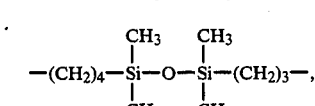

-continued $-(CH_2)_3-\underset{\underset{C_6H_5}{|}}{\overset{\overset{C_6H_5}{|}}{Si}}-O-\underset{\underset{C_6H_5}{|}}{\overset{\overset{C_6H_5}{|}}{Si}}-(CH_2)_3-,$

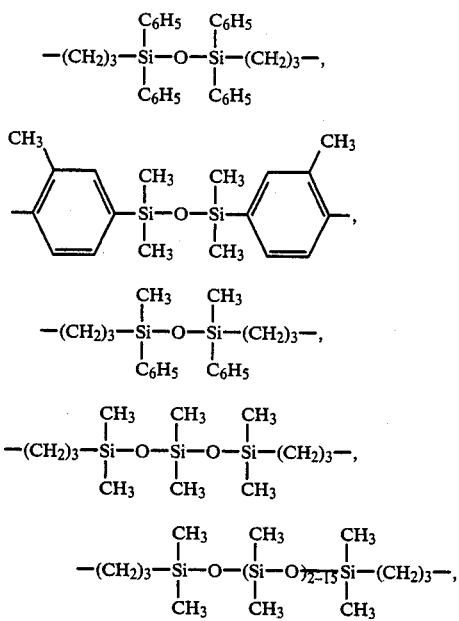

$-(CH_2)_3-\underset{\underset{C_6H_5}{|}}{\overset{\overset{CH_3}{|}}{Si}}-O-\underset{\underset{C_6H_5}{|}}{\overset{\overset{CH_3}{|}}{Si}}-(CH_2)_3-,$ $-(CH_2)_3-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-(CH_2)_3-,$ $-(CH_2)_3-\underset{\underset{CH_3}{|}}{\overset{\overset{CH_3}{|}}{Si}}-O-(\underset{\underset{CH_3}{|}}{\overset{\overset{CH_3}{|}}{Si}}-O)_{\overline{2-13}}\underset{\underset{CH_3}{|}}{\overset{\overset{CH_3}{|}}{Si}}-(CH_2)_3-,$ and the like.

Preferable groups $R^2$ are groups characterized by benzenoid unsaturation having at least 6 carbon atoms, for example,

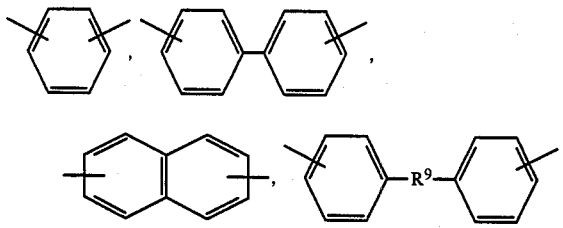

wherein $R^9$ is as defined above.

Each of the groups $R^3$, $R^4$, $R^5$ and $R^6$ in the formula (1) is hydrogen atom or a monovalent group having 1 to 30 carbon atoms, preferably 1 to 22 carbon atoms, such as a monovalent aliphatic group, a monovalent alicyclic group, a monovalent aromatic group, a monovalent group wherein an aliphatic group is combined with an aromatic group or an alicyclic group, or their halogen, nitro, amino, cyano, methoxy or acetoxy substituted groups.

The groups $R^3$, $R^4$, $R^5$ and $R^6$ are groups introduced in order to impart a hydrophobic property to a polyamide acid having the recurring unit of the formula (9):

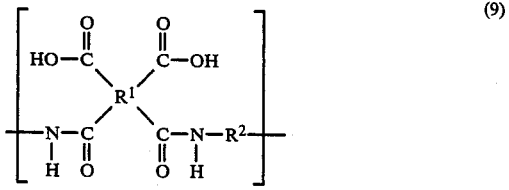

wherein $R^1$ and $R^2$ are as defined above. For forming a stable monolayer film on the water surface and permitting deposition of the film onto a substrate by the LB method, it is necessary that at least one of $R^3$, $R^4$, $R^5$ and $R^6$, preferably at least two of them, more preferably two of them, are not hydrogen atom and the above defined groups having 1 to 11 carbon atoms, preferably 1 to 15 carbon atoms, in other words, at least one of $R^3$, $R^4$, $R^5$ and $R^6$, preferably at least two of them, are a monovalent group having 12 or more carbon atoms, preferably 16 or more carbon atoms, selected from the above defined groups.

Representative examples of the groups $R^3$, $R^4$, $R^5$ and $R^6$ mentioned above are, for instance, $CH_3(CH_2)_{\overline{n-1}}$, $(CH_3)_2CH(CH_2)_{\overline{n-3}}$, $(CH_3)_3C(CH_2)_{\overline{n-4}}$,

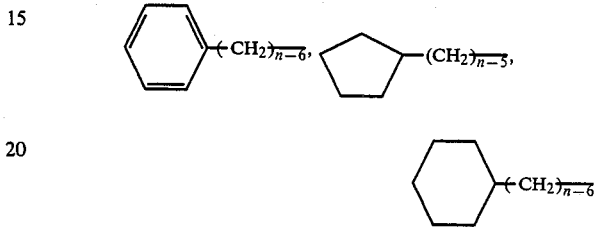

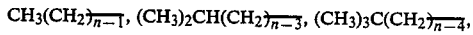

wherein n is an integer of 12 to 30, preferably 16 to 22, and the like.

For permitting the amphiphilic polyimide precursor of the invention to form a film by the LB technique, it is most preferable that at least one, preferably at least two, of the groups $R^3$, $R^4$, $R^5$ and $R^6$ are a straight-chain alkyl group of the formula: $CH_3(CH_2)_{\overline{n-1}}$ wherein n is as defined above, from the viewpoint of performances and cost. It is not essential that the substituent group, i.e. halogen atom, nitro group, amino group, cyano group, methoxyl group or acetoxyl group, as mentioned above, is included in the groups $R^3$, $R^4$, $R^5$ and $R^6$. But it is preferable that fluorine atoms are included in the groups $R^3$, $R^4$, $R^5$ and $R^6$, because fluorine atoms vastly improve the hydrophobic property as compared with hydrogen atoms.

In case that two of the group $R^3$, $R^4$, $R^5$ and $R^6$ are hydrogen atoms, the amphiphilic polyimide precursors of the present invention include, for instance, precursors having the recurring unit of the formula (2):

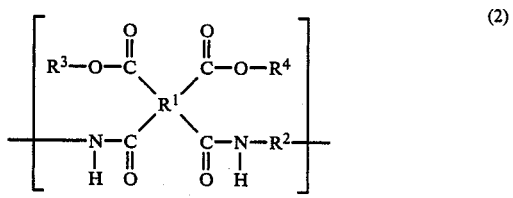

(2)

wherein $R^1$, $R^2$, $R^3$ and $R^4$ are as defined above, provided that $R^3$ and $R^4$ are not hydrogen atom and a group having 1 to 11 carbon atoms, precursors having the recurring unit of the formula (3):

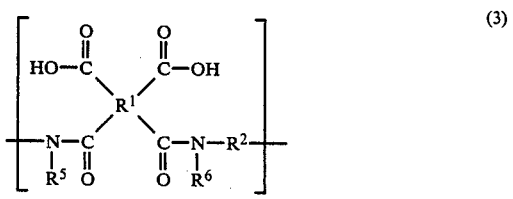

(3)

wherein $R^1$, $R^2$, $R^3$ and $R^4$ are as defined above, provided that $R^5$ and $R^6$ are not hydrogen atom and a group having 1 to 11 carbon atoms.

The amphiphilic polyimide precursors having the recurring unit of the formula (2) or (3) are advantageous due to its easy production and its cost.

Representative examples of the amphiphilic polyimide precursor having the recurring unit shown by the formula (1), (2) or (3) are, for instance, those having the recurring unit of the formula:

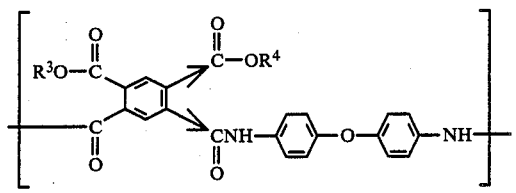

[in which typical examples of $R^3$ and $R^4$ are, for instance, $CH_3(CH_2)_{11}-$, $CH_3(CH_2)_{13}-$, $CH_3(CH_2)_{15}-$, $CH_3(CH_2)_{17}-$, $CH_3(CH_2)_{19}-$, $CH_3(CH_2)_{21}-$, and $CF_3(CH_2)_{15}-$],

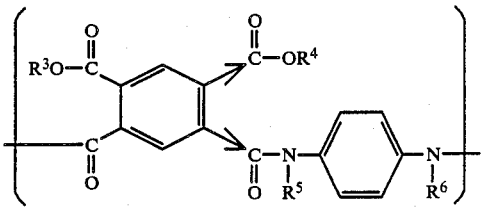

[in which typical examples of $R^3$ and $R^4$ are, for instance, $CH_3(CH_2)_{11}-$, $CH_3(CH_2)_{13}-$, $CH_3(CH_2)_{15}-$, $CH_3(CH_2)_{17}-$, $CH_3(CH_2)_{19}-$, $CH_3(CH_2)_{21}-$ and $CF_3(CH_2)_{15}-$, and typical examples of $R^5$ and $R^6$ are, for instance, $CH_3-$, $CH_3(CH_2)_2-$, $CH_3(CH_2)_3-$ and $CH_3(CH_2)_5-$],

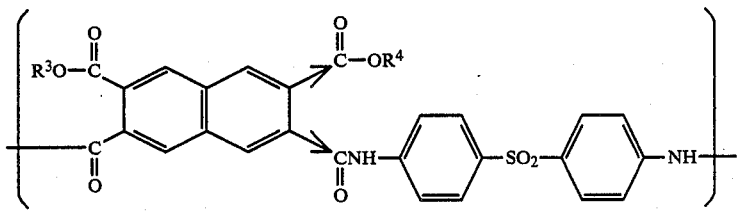

[in which typical examples of $R^3$ and $R^4$ are, for instance, $CH_3(CH_2)_{11}-$, $CH_3(CH_2)_{13}-$, $CH_3(CH_2)_{15}-$, $CH_3(CH_2)_{17}-$, $CH_3(CH_2)_{19}-$, $CH_3(CH_2)_{21}-$ and $CF_3(CH_2)_{15}-$], or the like.

In the above formulas, the symbol "→" means isomerism. The isomerism is explained with reference to the recurring unit of the formula:

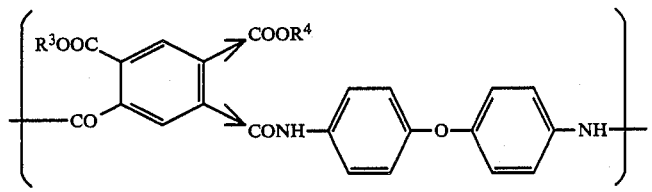

wherein the above formula represents both the recurring unit of the formula (a):

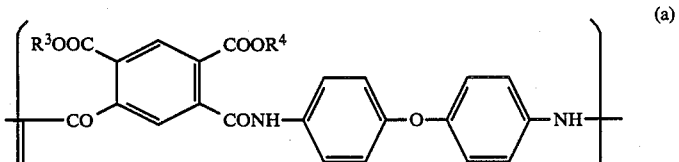

(a)

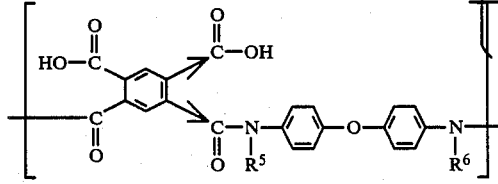

and the recurring unit of the formula (b):

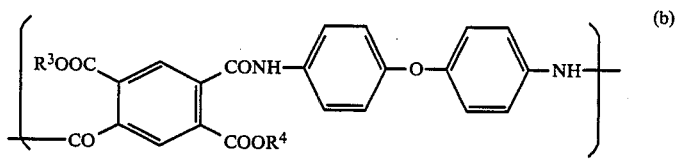

and in such a case, the symbol "→" indicating the isomerism is used.

In the present specification, the term "isomerism" or the symbol "→" covers both cases, one being the case where either one of the recurring units as shown by the formulas (a) and (b) is present alone, and the other being the case where the recurring units as shown by the formulas (a) and (b) are present together.

The amphiphilic polyimide precursor of the present invention having the recurring unit (1) may be a homopolymer comprising a single kind of recurring units or a copolymer comprising different kinds of recurring units. Various copolymers are provided when at least one of the groups $R^1$ to $R^6$ in the formula (1) is at least two kinds of groups selected from the respective representative examples of the groups $R^1$ and $R^6$ explained above.

For instance, when

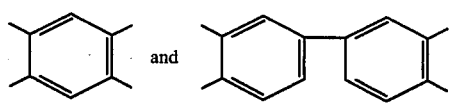

are selected as the group $R^1$, the recurring unit of the polyimide precursor is represented by the following formula:

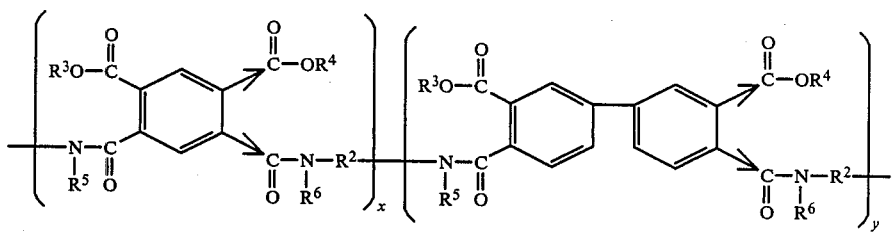

wherein x and y show the ratio, and $0<x<1$, $0<y<1$ and $x+y=1$.

When

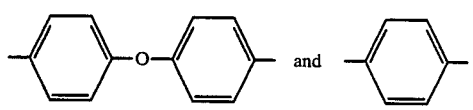

are selected as the group $R^2$, the recurring unit of the polyimide precursor is represented by the following formula:

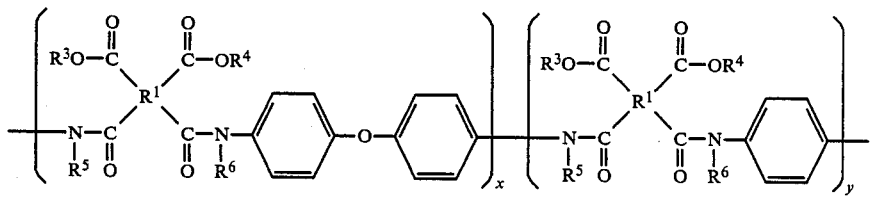

wherein x and y are as defined above. Also, with respect to the groups $R^3$, $R^4$, $R^5$ and $R^6$, many examples of the recurring unit of the copolymers can be mentioned, and for instance, the following recurring units are mentioned.

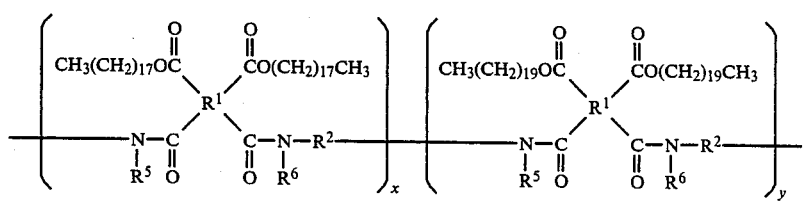

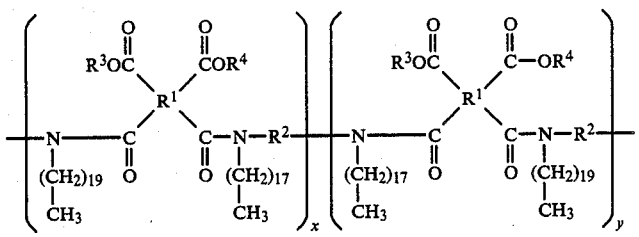

It is to be understood that the above examples of the recurring unit of the copolymers are presented only for illustration.

In general, the amphiphilic polyimide precursors of the present invention are soluble in an organic polar solvent such as N,N-dimethylacetamide, N,N-dimethylformamide, N,N-diethylformamide or hexamethylphosphoramide, and are soluble in a mixed solvent of the above-mentioned organic polar solvent and a usual organic solvent such as chloroform, and are slightly soluble or insoluble in a usual organic solvent such as chloroform, benzene, ether, acetone or methanol. In the infrared absorption spectrum of the precursor, characteristic absorptions for amide, carboxylic acid (in certain cases, carboxylic acid ester) and long chain alkyl groups are observed. The result of the thermal analysis of the precursors prepared particularly to have a good heat resistance is also characteristic, and a sudden loss of the weight begins at about 200° C. and is completed at 400° C. After the completion of the weight loss, the infrared absorptions for amide, carboxylic acid (in certain cases, carboxylic acid ester) and long chain alkyl groups disappear on the so heat-treated precursor, and an absorption for the imide ring appears. This means that the precursor is converted into polyimide.

The aforementioned explanation has been made with reference to the case where all the recurring units of the precursor are those represented by the formula (1). However, the precursors of the present invention may contain at most 30% by mole of the recurring unit of the formula (10):

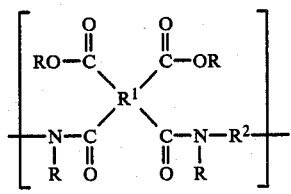

wherein $R^1$ and $R^2$ are as defined above, R is a monovalent group having 1 to 11 carbon atoms selected from the group consisting of a monovalent aliphatic group, a monovalent alicyclic group, a monovalent aromatic group, a monovalent group in which an aliphatic group is combined with an aromatic group or an alicyclic group, and these monovalent groups substituted with a halogen atom, nitro group, amino group, cyano group, methoxyl group or acetoxyl group, or hydrogen atom, and four groups R may be the same or different.

The amphiphilic polyimide precursors of the present invention having the recurring unit of the formula (1) can be prepared by the following method. A tetracarboxylic acid dianhydride of the formula (4):

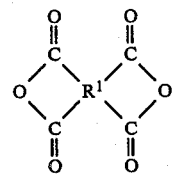

wherein $R^1$ is as defined above, is reacted with $R^3OH$ and $R^4OH$ wherein $R^3$ and $R^4$ are as defined above, to produce a compound of the formula (5):

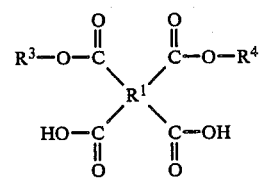

wherein $R^1$, $R^3$ and $R^4$ are as defined above. The compound (5) is then converted into an acid halide, for instance, by reacting with thionyl chloride, phosphorus pentachloride, benzenesulfonyl chloride, or the like in a substantially anhydrous polar solvent at a temperature of not lower than $-10°$ C., preferably about 0° to about 40° C. The acid halide is reacted with a compound of the formula (6):

$$R^5-NH-R^2-NH-R^6 \qquad (6)$$

wherein $R^2$, $R^5$ and $R^6$ are as defined above. The acid halide may be added to the compound (6), or inversely the compound (6) may be added to the acid halide. The reaction of the acid halide and the compound (6) is conducted at a temperature of not lower than $-10°$ C., preferably 0° to 10° C., and the post-reaction may be conducted at a temperature of not lower than 20° C. to complete the reaction.

There is a case where the reaction must be conducted at a temperature other than the general temperature range as mentioned above. That is to say, when the groups $R^5$ and $R^6$ are not hydrogen atom and the group having 1 to 11 carbon atoms, there is adopted a manner in which the acid halide of the compound (5) is added to a solution of the compound (6) at a temperature of 50° to 60° C. in order to cause the compound (6) to react in a homogeneous system.

Representative examples of the tetracarboxylic acid dianhydride (4) are, for instance:

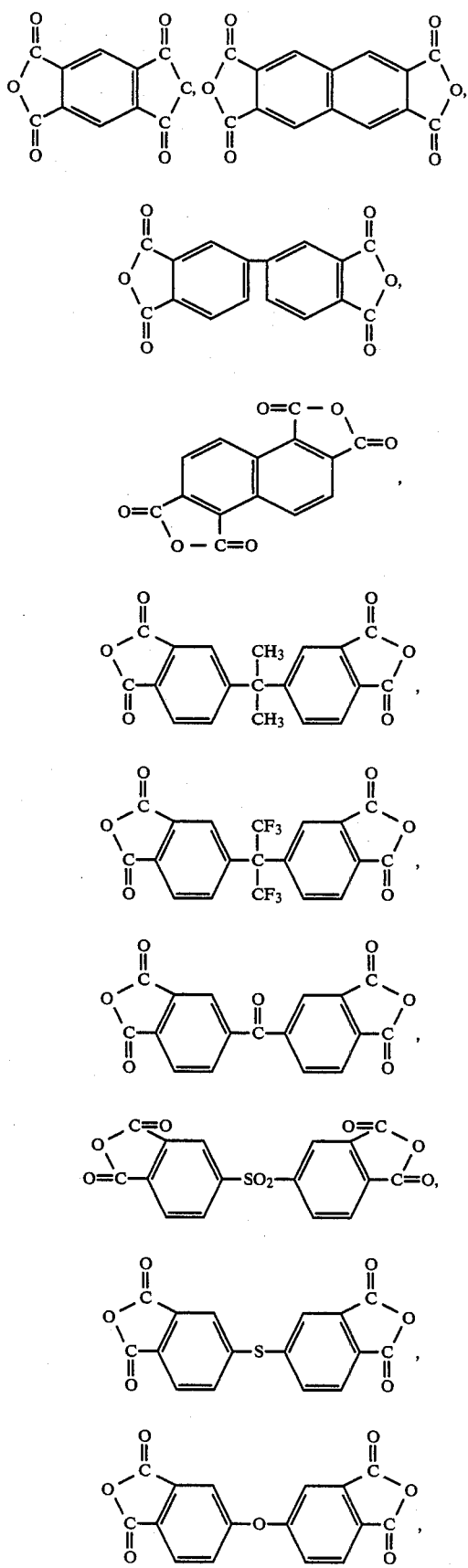

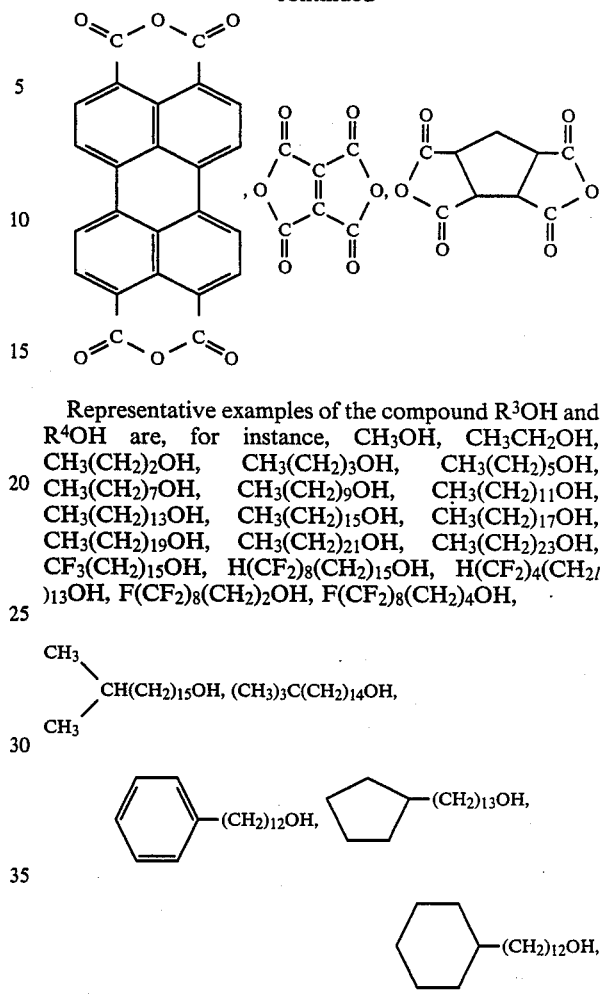

-continued

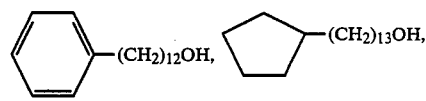

Representative examples of the compound $R^3OH$ and $R^4OH$ are, for instance, $CH_3OH$, $CH_3CH_2OH$, $CH_3(CH_2)_2OH$, $CH_3(CH_2)_3OH$, $CH_3(CH_2)_5OH$, $CH_3(CH_2)_7OH$, $CH_3(CH_2)_9OH$, $CH_3(CH_2)_{11}OH$, $CH_3(CH_2)_{13}OH$, $CH_3(CH_2)_{15}OH$, $CH_3(CH_2)_{17}OH$, $CH_3(CH_2)_{19}OH$, $CH_3(CH_2)_{21}OH$, $CH_3(CH_2)_{23}OH$, $CF_3(CH_2)_{15}OH$, $H(CF_2)_8(CH_2)_{15}OH$, $H(CF_2)_4(CH_2)_{13}OH$, $F(CF_2)_8(CH_2)_2OH$, $F(CF_2)_8(CH_2)_4OH$, $$\begin{matrix}CH_3\\ \phantom{CH_3}\diagdown\\ \phantom{CH_3}CH(CH_2)_{15}OH, (CH_3)_3C(CH_2)_{14}OH,\\ \phantom{CH_3}\diagup\\ CH_3\end{matrix}$$

and the like.

The reaction conditions for producing the compound (5) by the reaction of the tetracarboxylic acid dianhydride (4) with $R^3OH$ and $R^4OH$ are not particularly limited. For instance, the reaction can be conducted in a manner in which the reaction system is stirred at about 100° C. for several hours in a nitrogen stream, or there are adopted general conditions such that the reaction is conducted with stirring at room temperature for about 4 days in a solvent such as hexamethylphosphoramide. From the viewpoint of shortening the reaction time, namely better productivity, it is advantageous that the reaction is conducted with stirring at an elevated temperature, e.g. about 100° C., for several hours, e.g. 3 hours, in a nitrogen stream, and after cooling the reaction mixture, it is dissolved in hexamethylphosphoramide and is then subjected to the next reaction for converting into the acid halide. Of course, the obtained compound (5) may be purified by a method such as recrystallization, prior to converting into the acid halide, for the purpose of improving the purity.

As the polar solvents used in the reaction for converting the compound (5) into the acid halide, there are mentioned, for instance, hexamethylphosphoramide, N,N-dimethylacetamide and N,N-dimethylformamide. The solvents are used in a substantially anhydrous state. That is to say, the reaction for the conversion into the acid halide is conducted under an approximately quantitative condition such that thionyl chloride, phosphorus pentachloride, benzenesulfonyl chloride, or the like used in the reaction would not be decomposed by moisture.

When the reaction temperature for the conversion into the acid halide is lower than −10° C., the reaction becomes heterogeneous due to freezing of long chain alkyl groups. However, it is found by the present inventors that if the temperature is not lower than −10° C., a temperature up to near the boiling point of a acid halide can be used without restriction. Usually, the temperature within the range of about 0° to about 40° C. is preferable.

The thus prepared acid halide is then reacted with the compound (6) to produce the precursor of the present invention. From the viewpoint of the workability, it is desirable to use the obtained acid halide as it is without any treatment. In the reaction of the acid halide and the compound (6), both the reactants and the product tend to solidify as a result of the long chain alkyl group of the groups $R^3$, $R^4$, $R^5$ and $R^6$ being present in these compounds and, therefore, it is common to use a solvent such as N,N-dimethylacetamide or N,N-dimethylformamide. The reaction temperature is not lower than −10° C., preferably from −10° to +20° C., more preferably from 0° to +10° C. When the reaction temperature is lower than −10° C., the reaction becomes heterogeneous owing to freeze solidification. The reaction temperature over 20° C. should be avoided in the initial stage of the reaction because it is considered that in the initial stage undesirable reactions easily occur. However, the use of the reaction temperature over 20° C. in the latter stage of the reaction is advantageous in order to complete the reaction and in order to keep the reaction homogeneous to the completion of the reaction.

Representative examples of the compound (6) are, for instance,

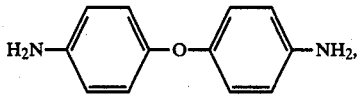

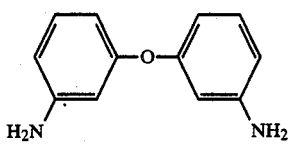

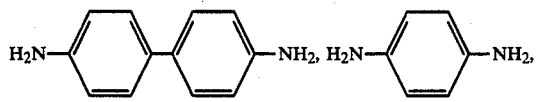

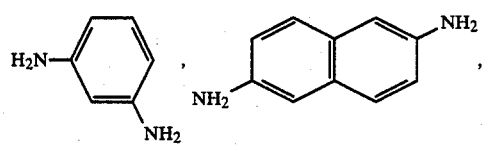

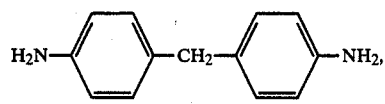

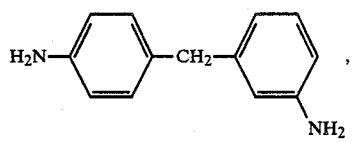

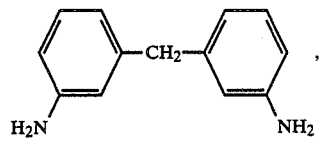

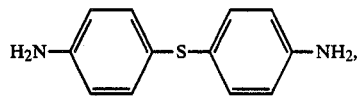

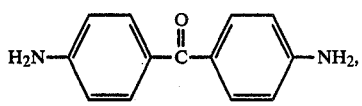

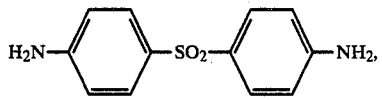

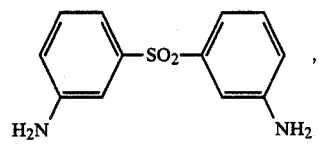

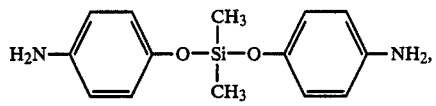

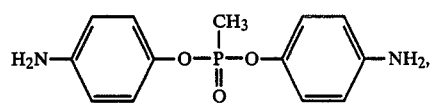

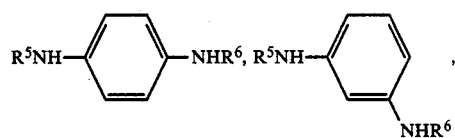

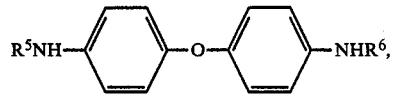

wherein $R^5$ and $R^6$ are as defined above. Representative examples of the groups $R^5$ and $R^6$ other than hydrogen atom are, for instance, $CH_3$—, $CH_3CH_2$—, $CH_3(CH_2)_2$—, $CH_3(CH_2)_3$—, $CH_3(CH_2)_5$—, $CH_3(CH_2)_{11}$—, $CH_3(CH_2)_{13}$—, $CH_3(CH_2)_{15}$—, $CH_3(CH_2)_{17}$—, $CH_3(CH_2)_{19}$—, $CH_3(CH_2)_{21}$—, $CH_3(CH_2)_{23}$—, $CF_3(CH_2)_{15}$—, $H(CF_2)_2(CH_2)_{15}$—, $H(CF_2)_4(CH_2)_{13}$—, $F(CF_2)_8(CH_2)_2$—, $F(CF_2)_8(CH_2)_4$—, and the like.

The ratio of the acid halide to the compound (6) is suitably selected so as to produce the precursor having a desired molecular weight. Conventionally, in preparing polyamide acids suitable for forming films, stoichiometric amounts of the purified monomers and a purified solvent have been used for obtaining the product having a high molecular weight. However, in the case where the precursor of the invention is used for forming films by building up monomolecular layers of the precursor on a substrate, a high molecular weight is not always required and even if the precursor does not have a high molecular weight, sufficient characteristics can be exhibited. Accordingly, the molar ratio of the reactants may deviate from a stoichiometric one, and the acid halide and the compound (6) can be used in a molar ratio of about 1/0.8 to about 1/1.2 without causing any problems.

When both the grous $R^3$ and $R^4$ of $R^3OH$ and $R^4OH$ to be reacted with the tetracarboxylic acid dianhydride are neither hydrogen atom not a group having 1 to 11 carbon atoms, both of the groups $R^5$ and $R^6$ in the compound (6) may be hydrogen atom, and in that case, the precursors having the recurring unit represented by the formula (2) are obtained. The use of the compound (6), in which both of the groups $R^5$ and $R^6$ are hydrogen atom, is advantageous in that the reactivity is good and the raw material is inexpensive. Also, in that case, since the —$COOR^3$ and —$COOR^4$ groups in the obtained precursor are in the form of esters, the precursor is thermally stable and the reaction scarcely proceeds in isolation and in the drying steps and, therefore, the precursor is separable in the form of solid powder and thus purification is easy.

The amphiphilic polyimide precursors of the present invention can be prepared by the process mentioned above. When both of the groups $R^3$ and $R^4$ in the formula (1) are hydrogen atom, the precursors can also be prepared by directly reacting the tetracarboxylic acid dianhydride (4) with a compound of the formula (7):

$$R^7-NH-R^2-NH-R^8 \quad (7)$$

wherein $R^7$ and $R^8$ are as defined above. In that case, the products are those having the recurring unit represented by the formula (8). The reaction can be made either in a manner in which the tetracarboxylic acid dianhydride (4) is added to the compound (7) or in a manner in which the compound (7) is added to the dianhydride (4).

Representative examples of the compound (7) are, for instance,

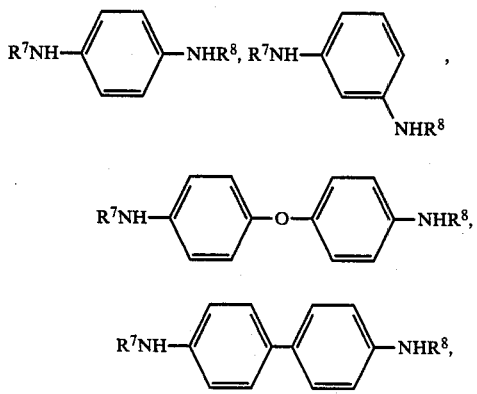

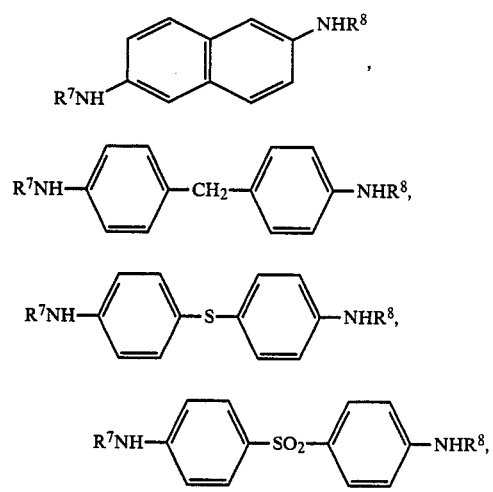

wherein $R^7$ and $R^8$ are as defined above. Representative examples of the groups $R^7$ and $R^8$ are, for instance, $CH_3(CH_2)_{11-29}$, $CF_3(CH_2)_{15}$, $H(CF_2)_2(CH_2)_{15}$, $H(CF_2)_4(CH_2)_{13}$, $F(CF_2)_8(CH_2)_2$, $H(CF_2)_8(CH_2)_4$, and the like.

Approximately the same conditions as those in the conventional preparation of polyamide acids are applicable to the reaction of the tetracarboxylic acid dianhydride (4) and the compound (7). For instance, the reaction is conducted in a substantially anhydrous organic polar solvent such as N,N-dimethylacetamide or N,N-dimethylformamide at a temperature of not higher than 50° C., preferably 40° to 50° C., using the compound (7) in an amount of 0.8 to 1.2 moles per mole of the tetracarboxylic acid dianhydride (4). Even if the amounts of the reactants deviate from the stoichiometric amounts, the obtained precursors exhibit satisfactory characteristics.

The thus prepared precursors (8) have also the features that they can form films by the LB method and provide polyimides by heating, in addition to easiness in preparation.

LB films can be formed from the precursors of the present invention by any of the so-called LB technique without restriction, e.g. the vertical dipping method (LB method), the horizontal dipping method, the revolving cylindrical method and so on (as described in Shin Jikken Kagaku Koza, Vol. 18, "Interface and Colloid", pages 498–508). The LB technique is a method in which a LB material is spread onto the surface of water and compressed at a constant surface pressure to form a monomolecular layer film and the monomolecular layer is transferred onto a substrate.

In general, a solvent such as benzene or chloroform, which evaporates into a gas phase without dissolving in water, is used for spreading an LB film forming material onto the water surface. In the case of the precursors of the present invention, it is preferable to use such a usual solvent in combination with an organic polar solvent for increasing the solubility. Examples of the organic polar solvent are, for instance, N,N-dimethylformamide, N,N-dimethylacetamide, N,N-diethylformamide, N,N-diethylacetamide, N,N-dimethylmethoxyacetoamide, dimethylsulfoxide, N-methyl-2-pyrrolidone, pyridine, dimethylsulfone, hexamethylphosphoramide, tetramethylenesulfone, dimethyltetramethylenesulfone, and the like. When benzene, chloroform or the like is used in combination with the organic polar solvent, it is considered that when the precursor solution is spread onto the water surface, benzene, chloroform or the like evaporates into the gas phase and the organic polar solvent dissolves into a large quantity of water.

The concentration of the precursor solution to be spread onto the water surface is not particularly limited, but is usually selected from $2 \times 10^{-3}$ to $5 \times 10^{-3}$ M.

The substrates used for forming LB films of the precursors thereon are not particularly limited, and are selected according to the uses of the formed LB film. In converting the LB film into a polyimide film by heating the LB film of the precursor, it is necessary that the substrates have a good heat resistance.

Examples of the substrate used in forming the LB films are, for instance, an inorganic substrate such as glass, alumina or quartz, a metal substrate, a plastic substrate, a substrate of a semiconductor of Groups IV, III-V, II-VI of the Periodic Table such as Si, GaAs or ZnS, a substrate of a ferroelectric substance such as $PbTiO_3$, $BaTiO_3$, $LiNbO_3$ or $LiTaO_3$, a substrate of a magnetic substance, and the like. The substrates may be surface-treated in a usual manner.

The precursors of the present invention can form thin films having no or little defect and having a good heat resistance by the LB method, and can provide thin films having a further improved heat resistance by partially or completely converting the precursor thin film into a polyimide.

Methods for converting the precursor into polyimide are not particularly limited, but heating at a temperature of about 200° to about 400° C. is common. The conversion can also be conducted by using laser lights. Of course, chemical curing agents, such as acetic anhydride and pyridine which have been conventionally used in converting polyamide acids into polyimides, may be used in the invention, and such means may be used in combination with thermal reaction. Polyimides are produced from the precursors of the invention, for instance, according to the following reaction schemes shown with respect to the precursor (2) and the precursor (3).

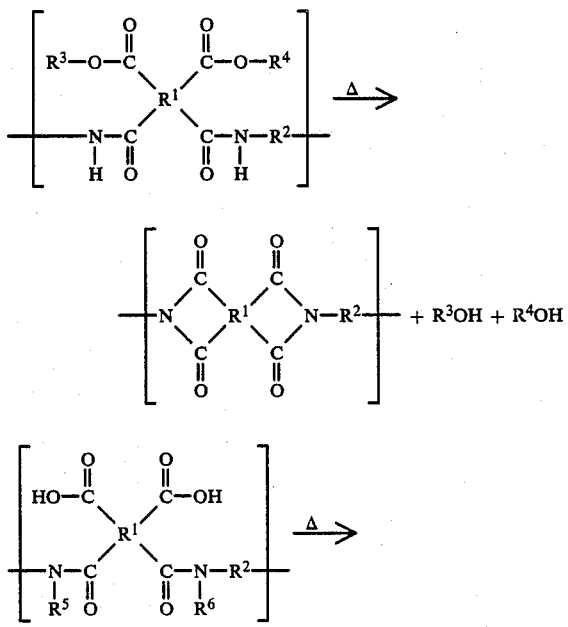

-continued

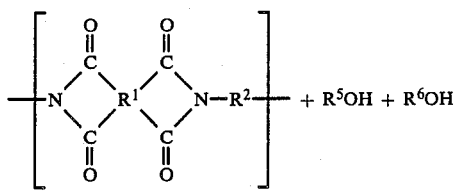

Of course, the polyamide acid represented by the formula (9) can be converted into a polyimide with formation of $H_2O$, but this polyamide acid (9) is not usable as a material for forming LB films.

When the precursor converts into a polyimide, the groups introduced for imparting the hydrophobic property to a polyamide acid eliminate in the form of an alcohol. Since the eliminated alcohol can be removed away or scattered away, for instance, by conducting the conversion into polyimide in a gas stream or under vacuum at a temperature of about 200° to about 400° C., polyimide films having excellent heat resistance and electric insulation property can be obtained.

While the area-time curve clearly reveals that the amphiphilic polyimide precursors of the present invention form ideal Y-type films by the LB method (vertical dipping method), the linearity of the relationship between the inverse capacitance (1/C) and the number of layers in the built-up film and data of X-ray diffraction suggest that a layer structure expected of LB films is present in the built-up films of the amphiphilic polyimide precursors of the present invention. Also, the thin films of the precursors of the invention have good heat resistance, dielectric characteristics and electric insulation properties as well as an excellent controllability of film thickness. Therefore, the LB films of the precursors can be directly used for various purposes such as in electronic devices.

The polyimide thin films obtained from the precursors of the present invention have excellent heat resistance and chemical resistance and good mechanical properties. Because of the linearity of the relationship between 1/C and the number of layers, the built-up film retains its excellent thickness controllability even after conversion into polyimide, thus it is possible to control the thickness of polyimide thin films on the basis of the number of layers in the built-up films of the precursors. Furthermore, it is assumed that a layer structure is present in the polyimide thin films, and also it has been made clear that the polyimide thin films prepared according to the present invention have excellent dielectric characteristics and electric insulation properties.

In particular, according to the present invention, it is possible to provide the polyimide thin films which have a high dielectric strength of not less than $1 \times 10^6$ V/cm even if the thickness is less than 1,000 Å. The films with a thickness of about 10,000 Å having good physical properties can be realized by the LB method, but when the preparation cost is taken into consideration, the thinner, the more inexpensive, and also from the viewpoint of utilization, thin films which cannot be prepared by other methods are of interest. That is to say, films having a thickness of not more than 2,000 Å, especially films having a thickness of not more than 1,000 Å or of several hundreds of angstroms or films having a thickness of 5 to 100 Å, have a possibility of new interesting applications. However, it has hitherto been difficult to realize a dielectric strength of not less than $1 \times 10^6$ V/cm with such a film thickness. According to the present invention, there can be provided polyimide thin films having a dielectric strength of not less than $1 \times 10^6$ V/cm which can be sufficiently utilized in the electronic field. In particular, in case of the films having a thickness of about 50 Å to several hundreds of angstroms, unique effects produced by film thickness, e.g. tunnel effect, are expected, and many attractive applications utilizing them become possible.

Such a thin polyimide film can also be formed by spin coating or vapor deposition, but a highly skilled technique is required in achieving a dielectric strength of not less than $1 \times 10^6$ V/cm even with a thickness of more than 1 μm. Accordingly, it is to be understood that by the existing techniques, it is difficult to form polyimide thin films with a thickness of not more than 1,000 Å having a dielectric strength of not less than $1 \times 10^6$ V/cm as obtained by the present invention.

Further, thin films obtained by partial conversion into polyimide under mild conditions rather than complete conversion also have a good heat resistance of more than 200° C. and excellent chemical resistance, mechanical strength and electric insulating properties. The partially converted films are of course very thin films with a thickness of not more than 10,000 Å, and it is possible to provide films having a thickness, e.g. 5,000 Å, 2,000 Å or 10 to 1,000 Å. Although the partially converted films are inferior in heat resistance to the complete polyimide films, but the electric insulation and dielectric characteristics thereof are rather superior to the complete polyimide films because the long chain alkyl groups remain.

By utilizing the above-mentioned excellent properties, e.g. heat resistance, chemical resistance, mechanical characteristics and electric insulation properties, and the film thickness of not more than 10,000 Å, e.g. 5 to 1,000 Å, the thin films of the present invention can be used in various fields of art such as electronics, energy conversion and material separation.

For instance, by utilizing electric conductivity, photo-conductivity, optical property, insulating property, thermal property and chemical reactivity, the thin films obtained according to the present invention are usable as optical recording film, resist film, insulation film, thin film for capacitors, liquid crystal orientation film, polarization film, and sensor film. In particular,, in case of the insulation film, the thin films of the invention are useful as insulation films for IC and LSI and can be used as insulation films in electric and electronic devices having MIS or MIM structure wherein various semiconductors and metals are combined with insulation films, e.g. field effect transistor, photoelectric device, light emitting device, light receiving device, light detecting device, and thermoionic transistor. In particular, the thin films of the present invention are useful for use in MIS and MIM devices utilizing the tunnel effect and are usable as insulation films for JJ (Josephson junction).

In addition, it is also possible to utilize the precursors of the invention as cladding material for waveguide and a component for optical circuit.

Further, the precursors of the invention are suitable as protective coating materials in various fields. By utilizing the techniques for mixed films or assembled films of functional LB materials and fatty acids generally used in the field of LB films so as to use the precursors of the present invention instead of the fatty acids, various functionalities can be revealed and the uses for them are considered. For instance, photoelectric devices and biosensors can be fabricated by forming films containing pigments or enzymes.

The present invention is more specifically described and explained by means of the following Examples. It is to be understood that the present invention is not limited to the Examples, and various changes and modifications may be made in the invention without departing from the spirit and scope thereof.

EXAMPLE 1

A flask was charged with 2.18 g (0.01 mole) of pyromellitic dianhydride and 5.40 g (0.02 mole) of stearyl alcohol, and they were reacted at about 100° C. for 3 hours in a dry nitrogen stream.

The resulting reaction product was dissolved in 40 ml of hexamethylphosphoramide and cooled to 0° to 5° C. To the solution was added dropwise 2.38 g of thionyl chloride at about 5° C. After the completion of the addition, the solution was maintained at about 5° C. for 1 hour to complete the reaction.

To the reaction mixture was then added dropwise 2 g (0.01 mole) of diaminodiphenyl ether dissolved in 50 ml of dimethylacetamide at a temperature of 0° to 5° C., and after the completion of the addition, the reaction was further continued for 1 hour. The reaction mixture was poured into 600 ml of distilled water to precipitate the reaction product. The precipitate was filtered and dried under reduced pressure at about 40° C. to give about 9 g of a light yellow powder.

IR absorption analysis, thermal analysis (TGA and DTA), and measurement of molecular weight by gel permeation chromatography (GPC) were made, and it was confirmed that the product was the objective polyimide precursor.

(IR absorption analysis)

IR spectrum of the product measured by KBr disk method is shown in FIG. 1. Characteristic absorptions of ester, amido I, II and III absorption bands, alkyl chain and ether are observed in the spectrum.

(Thermal analysis)

Figure 2:
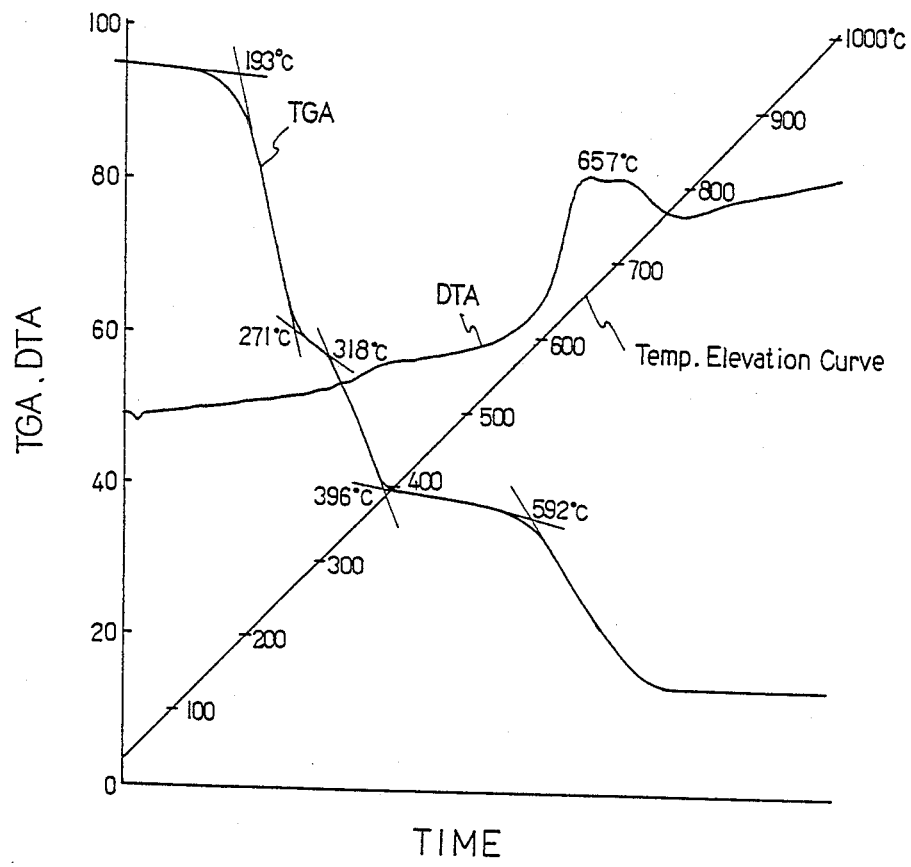
FIG. 2 is a graph showing the results of thermal analysis (thermogravimetric analysis-differential thermal analysis) of the precursor obtained in Example 1.

The results of thermal analysis measured by a RTG-DTA(H) type analyzer made by Rigaku Denki Kabushiki Kaisha with full scale 10 mg for TGA (thermogravimetric analysis) and 100 μV for DTA (differential thermal analysis) by elevating the temperature at a rate of 10° C./minute to 1,000° C. in a nitrogen stream (30 ml/minute) are shown in FIG. 2.

In the TGA curve, inflection points are observed at 193° C., 271° C., 318° C., 396° C., and 592° C. In the DTA curve, a characteristic peak is observed in the neighborhood of 657° C.

The thermal analysis of the product was also conducted by raising the temperature to 400° C. at a rate of 10° C./minute, maintaining the temperature at 400° C. for 1 hour, dropping the temperature to room temperature and raising the temperature again to 1,000° C. at a rate of 10° C./minute. The results are shown in FIG. 3.

Figure 3:
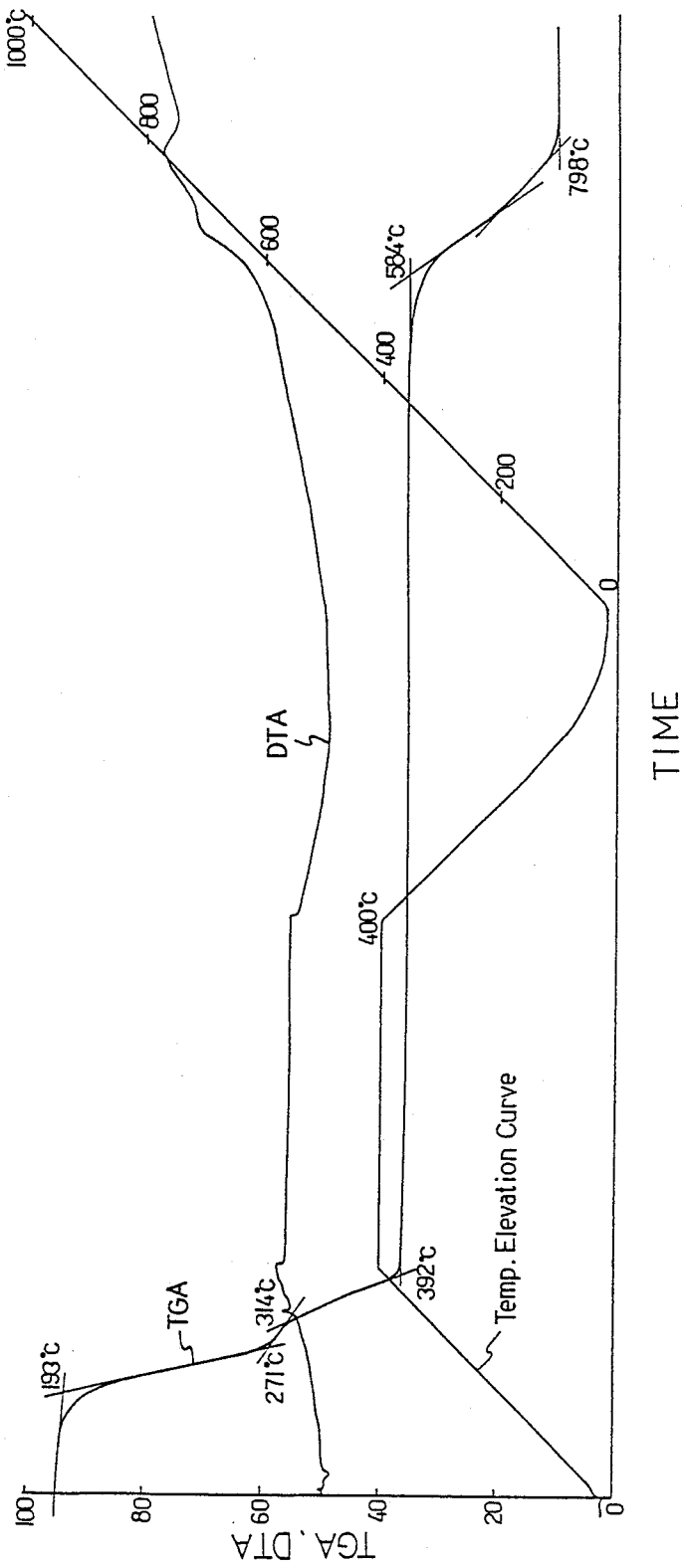
FIG. 3 is a graph showing the results of thermal analysis (TGA-DTA) of the precursor obtained in Example 1 when the temperature is raised from room temperature to 400° C., maintained at 400° C. for 1 hour, dropped to room temperature and is further raised to 1,000° C.

It is observed in FIG. 3 that by keeping the temperature at 400° C. for 1 hour, the weight of the product reaches approximately a constant weight, thus the conversion into polyimide is completed, and that there is no weight change until exceeding 450° C. even if the so heat-treated sample is cooled to room temperature and again heated, and thermal decomposition starts at 584° C. These characteristics are the same as the thermal decomposition temperature of polyimide films like Kapton (trade mark). So, similar heat stability can be expected of the polyimide of the present invention.

(Measurement of molecular weight by GPC)

The number average molcular weight of the product measured by using N,N-dimethylacetamide as a solvent was about 50,000 (calculated in terms of polystyrene).

EXAMPLE 2

A solution of a polyimide precursor to be spread onto the surface of water for forming a monomolecular film was prepared by dissolving 55.1 mg of the product obtained in Example 1 in a mixed solvent of distilled chloroform and dimethylacetamide in a ratio of 8:2 by volume so that the total volume was 25 ml.

Figure 4:
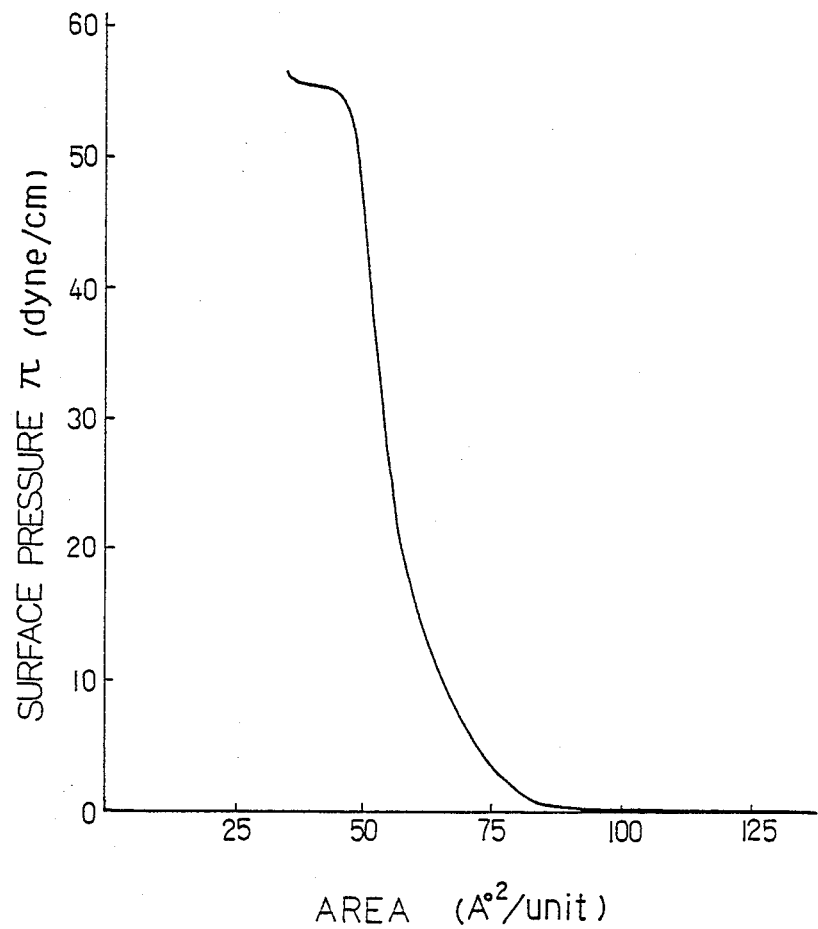
FIG. 4 is a graph showing the relationship between the surface pressure and the area per recurring unit of the precursor obtained in Example 2 described after.

The obtained solution was spread onto the surface of bidistilled water, and the relationship between the surface pressure ($\pi$) and the area per recurring unit (unit) was measured at 20° C. The result is shown in FIG. 4. The surface pressure suddenly increased from about 75 Å$^2$/unit and a good condensed film was formed. The limiting area was 60 Å$^2$/unit, and the collapse pressure was 55 dyne/cm which was very high for a polymer film. Also, the monolayer on the water surface was so stable that even if it was maintained on the water surface with keeping the surface pressure at 25 dyne/cm, no decrease in area was observed over 2 hours.

A built-up film of 60 layers was formed on a glass substrate or a CaF$_2$ plate substrate according to the LB method by raising and lowering the substrate through the water surface at a speed of 10 mm/minute, while maintaining the surface pressure of the monolayer on the water surface at 25 dyne/cm at 20° C.

Figure 5:
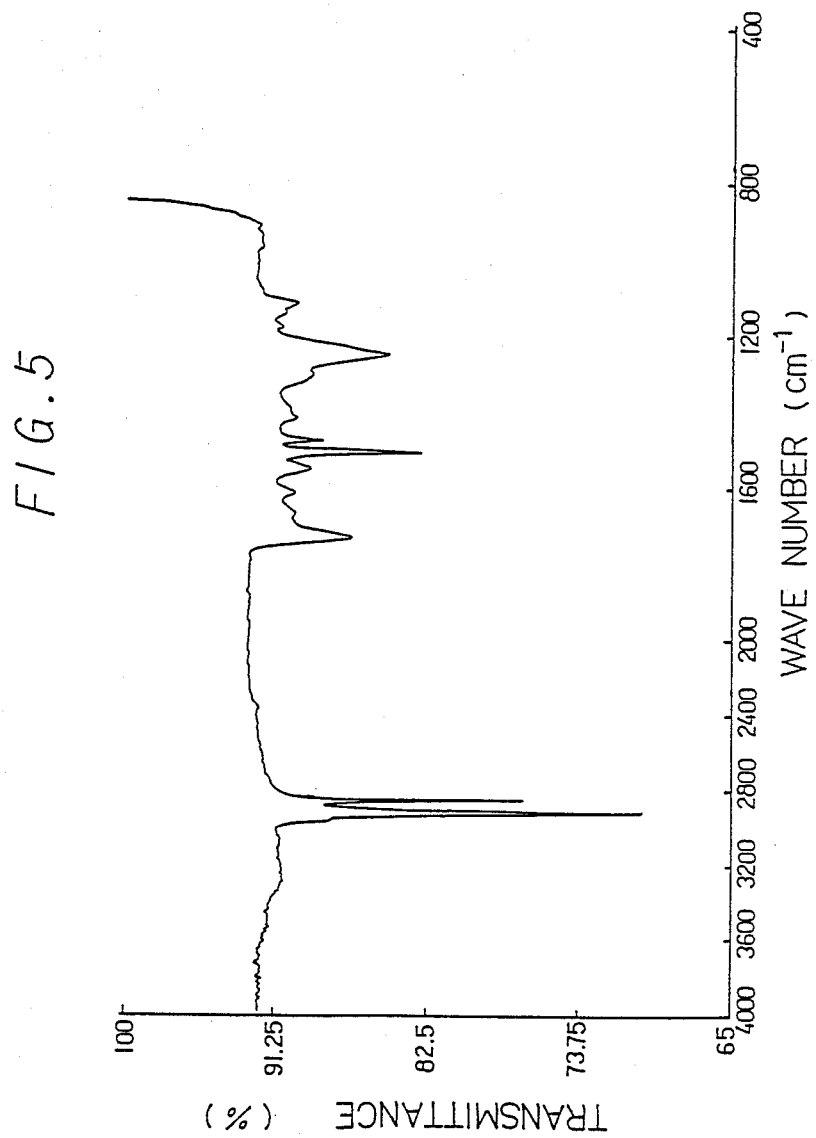
FIG. 5 is an infrared absorption spectrum measured by the FT-IR method of films built-up on a $CaF_2$ plate by the LB method.

The film formed on the CaF$_2$ plate was analyzed by FT-IR analysis. The obtained IR absorption spectrum is shown in FIG. 5. From the IR spectrum, it was confirmed that the built-up film was a film of the compound obtained in Example 1. Also, from the area-time curve, it was confirmed that the built-up film was a Y-type film. Further, in the X-ray diffraction of the built-up film, one peak was observed at $2\theta = 4.65°$ despite that no Cd$^{++}$ ion was included in water used in this Example. Also, the thickness of the built-up film was about 1,800 Å, and it was confirmed by measurement of capacitance that the built-up film had good insulation characteristics.

The built-up film was heated at 400° C. for 1 hour, and subjected to FT-IR analysis. From the presence of peaks at 1,790 and 1,710 cm$^{-1}$ in the IR spectrum, it was confirmed that imide with $\alpha,\beta$-unsaturated 5-membered ring was produced.

With respect to the product of Example 1, it is also confirmed by IR absorption analysis, etc. that weight loss of 58% occurs by heating at 400° C. for 1 hour, thus it converts into imide. This weight loss well agrees to the value calculated supposing that 2 molecules of stearyl alcohol are eliminated from each recurring unit of the precursor. The calculated value is 58.7%.

COMPARATIVE EXAMPLE 1

A polyimide precursor was prepared in the same manner as in Example 1 except that n-decyl alcohol (n-C$_{10}$H$_{21}$OH) was used instead of stearyl alcohol.

Figure 6:
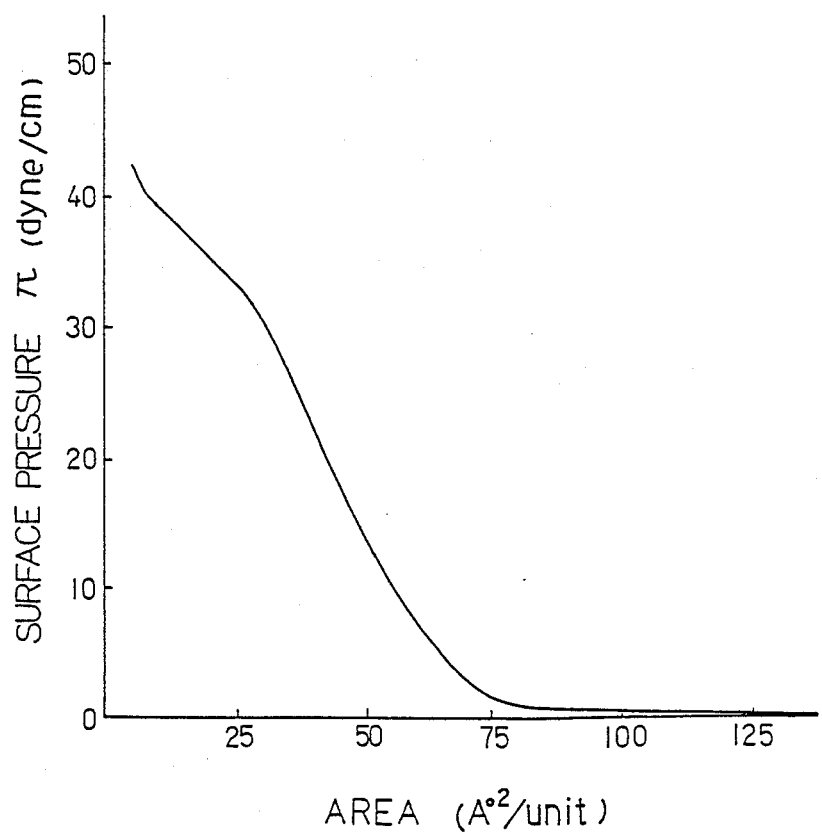
FIG. 6 is a graph showing the relationship between the surface pressure and the area per recurring unit of the precursor obtained in Comparative Example 1 described after.

The results of IR analysis, thermal analysis and measurement of molecular weight by GPC of the obtained precursor showed approximately the same characteristics as those of the polyimide precursor obtained in Example 1, but the surface pressure-area curve thereof was different. The surface pressure-area curve is shown in FIG. 6. The obtained precursor showed only a liquid expansion phase, and did not show the presence of a condensed monomolecular layer. From this result, it is understood that the introduction of an alkyl group having 10 carbon atom into a polyamide acid is too short in chain length to obtain a stable monomolecular layer. For instance, the film maintained at 20 dyne/cm in surface pressure on the water surface was unstable, thus the precursor obtained in this example did not give a good built-up film.

EXAMPLES 3 TO 5

Polyimide precursors were prepared in the same manner as in Example 1 except that lauryl alcohol (C$_{12}$), myristyl alcohol (C$_{14}$) or cetyl alcohol (C$_{16}$) was used instead of stearyl alcohol.

The obtained precursor by using the C$_{12}$ or C$_{14}$ alcohol showed behaviors intermediate between those for C$_{10}$ and C$_{18}$, and formed a sufficiently stable monolayer and could form a built-up film.

The precursor obtained by using the C$_{16}$ alcohol formed a very stable monolayer on the water surface and could form a good built-up film.

Also, it was confirmed that the precursors obtained in these Examples were converted into polyimides by heat treatment.

EXAMPLE 6

The reaction of 10.91 g of pyromellitic dianhydride and 27.05 g of stearyl alcohol was carried out at 120° C. for 3 hours. The reaction product was recrystallized from 200 ml of ethanol to give distearyl pyromellitate having a melting point of 133° to 137° C.

In 60 ml of hexamethylphosphoramide was dissolved 3.79 g of distearyl pyromellitate, and 1.19 g of thionyl chloride was added dropwise to the resulting solution at about 5° C. After the completion of the addition, the mixture was maintained for 1 hour to complete the reaction. To the reaction mixture was added dropwise at 5° C. over 30 minutes 0.54 g of p-phenylenediamine dissolved in 25 ml of dimethylacetamide, and the mixture was further stirred for 1 hour. The reaction mixture was then poured into 300 ml of ethanol, and the precipitated polymer was filtered and dried under reduced pressure at 40° C. to give about 3 g of light yellow powder.

The results of IR analysis and $^1$H NMR analysis of the obtained powder are as follows:

(IR analysis)

Figure 7:
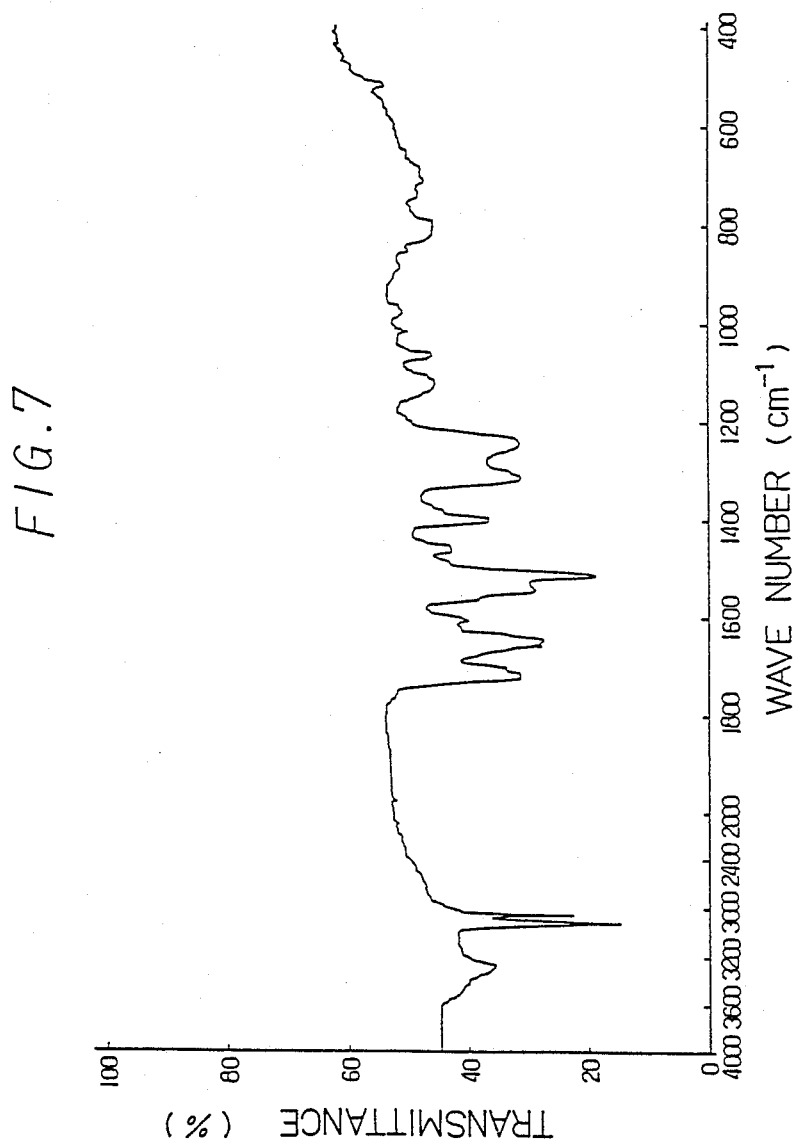
FIG. 7 is an infrared absorption spectrum of the precursor of the present invention obtained in Example 6 described after.

The IR spectrum measured by KBr method is shown in FIG. 7. Characteristic absorptions of ester, amido I, II and III absorption bands and alkyl chain are observed in the spectrum.

($^1$H NMR analysis)

The analysis was conducted by using a mixed solvent of CDCl$_3$ and DMF-d$_7$. Peaks were observed at $\delta$ values, 0.7–1.7 (7OH, CO$_2$CH$_2$C$_{17}$H$_{35}$), 4.2 (4H, CO$_2$CH$_2$C$_{17}$H$_{35}$), 6.40–7.10 (4H, aromatic) and 7.30–8.30 (2H, aromatic), but proton of CONH was not observed.

EXAMPLE 7

The LB film-forming properties of the product obtained in Example 6 were evaluated in the same manner as in Example 2.

Figure 8:
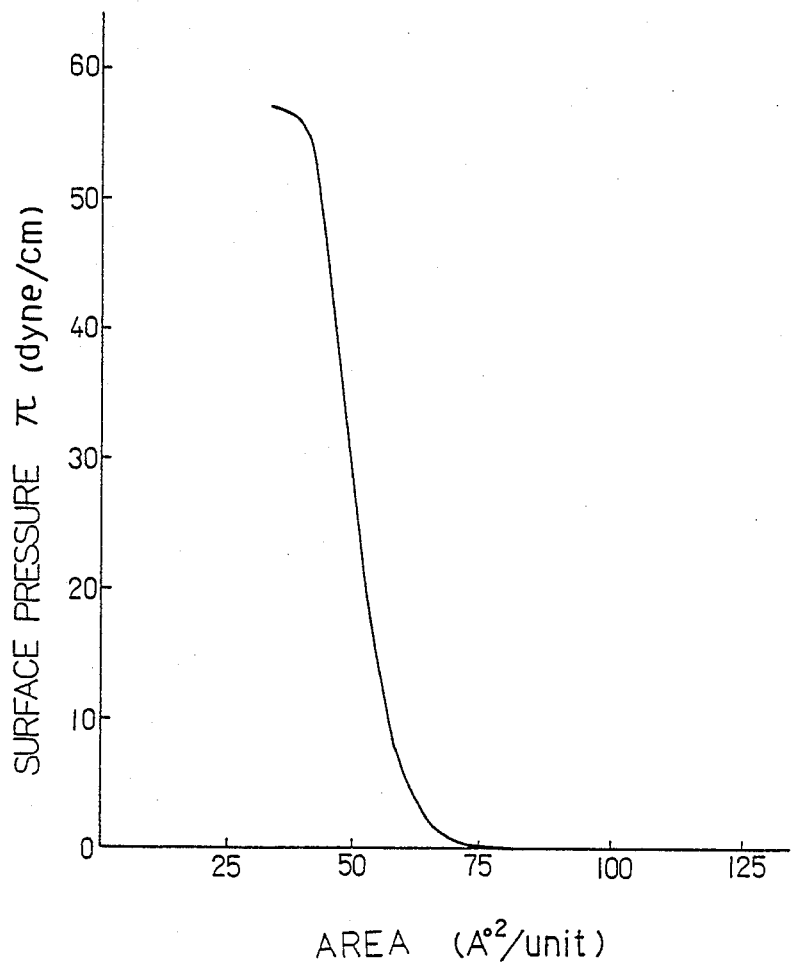
FIG. 8 is a graph showing the relationship between the surface pressure and the area per recurring unit of the precursor obtained in Example 6.

The surface pressure-area curve measured on bidistilled water at 20° C. is shown in FIG. 8. The surface pressure suddenly increased from about 65 Å$^2$/unit, and a good condensed monolayer was formed. The limiting area was about 55 Å$^2$/unit, and the collapse pressure was 55 dyne/cm.

A built-up film of 31 layers was formed on an aluminum deposited glass substrate by vertical dipping method at a dipping speed of 10 mm/minute, while maintaining the surface pressure of the monolayer on the water surface at 25 dyne/cm at 20° C. The state of meniscus during stacking was good. From the area-time curve, it was confirmed that the built-up film was a Y-type film.

EXAMPLE 8

Synthesis of N,N'-distearyl-p-phenylenediamine

In a nitrogen stream, 15.6 g of p-phenylenediamine, 15.5 g of stearyl bromide and 1.96 g of powdery caustic soda were reacted with stirring at a temperature of 140° to 150° C. for 3.5 hours. After the completion of the reaction, 50 ml of water was added to the reaction mixture. A blackish purple solid was filtered, washed with water, ethanol and methylene chloride in that order and filtered off to give about 5.8 g of pink powder.

By the $^1$H NMR analysis, IR analysis and elemental analysis of the obtained powder, it was confirmed that the product was N,N'-distearyl-p-phenylenediamine.

($^1$H NMR analysis)

The analysis was conducted using CDCl$_3$ as a solvent. Peaks were observed at δ values, 0.5-2.5 (74H, C$_{18}$H$_{37}$), 3.5 (2H, NH) and 6.5-8 (4H, aromatic).

(IR analysis)

Figure 9:
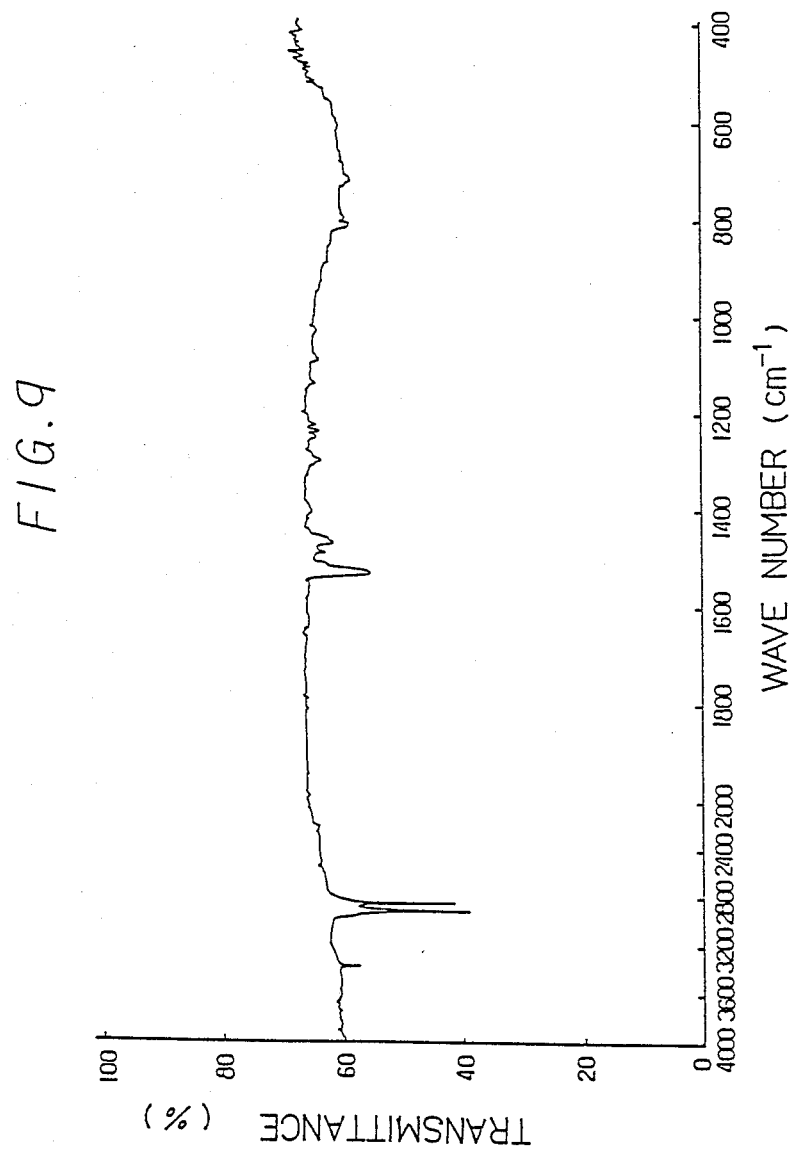
FIG. 9 is an infrared absorption spectrum of N,N'-distearyl-p-phenylenediamine which is usable as one of the starting materials for preparing the precursors of the present invention.

The IR spectrum measured by KBr disk method is shown in FIG. 9.

Synthesis of precursor from distearyl pyromellitate and N,N'-distearyl-p-phenylenediamine In 50 ml of hexamethylphosphoramide was dissolved 2.28 g of distearyl pyromellitate. To the resulting solution was added dropwise 0.714 g of thionyl chloride at room temperature, and the mixture was further stirred for 1 hour. The obtained reaction mixture was added dropwise with stirring at a temperature of about 50° to about 60° C. to a solution of 1.84 g of N,N'-distearyl-p-phenylenediamine dissolved in 80 ml of hexamethylphosphoramide. The mixture was further stirred at that temperature for 1 hour, and poured into 600 ml of redistilled water and allowed to stand overnight. The resulting precipitate was filtered and washed to give 3.9 g of grayish green powder.

The obtained powder was subjected to IR analysis, $^1$H NMR analysis, thermal analysis and measurement of molecular weight by GPC in the same manner as in Example 1, and it was confirmed that the product was the objective precursor.

(IR analysis)

Figure 10:
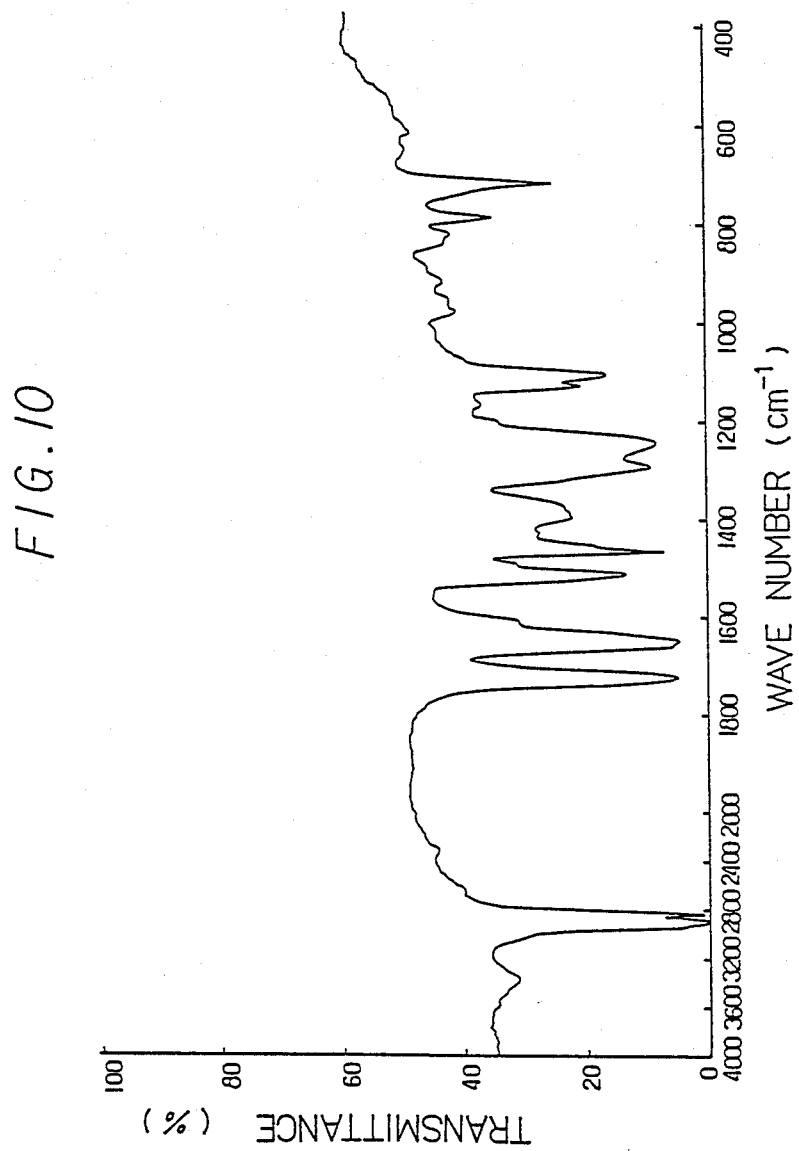
FIGS. 10, 11 and 12 are an infrared absorption spectrum, a graph showing the results of thermal analysis, and a graph showing the relationship between the surface pressure and the area per recurring unit, respectively, with respect to the precursor of the present invention obtained in Example 8 described below.

The IR spectrum is shown in FIG. 10.

Characteristic absorptions of ester and alkyl chain are observed in the spectrum as in Examples 1 and 7, but since the precursor obtained in this Example has no hydrogen of amido group, a strong absorption of amido II absorption band is not observed at 1,550 cm$^{-1}$.

($^1$H NMR analysis)

The analysis was conducted using CDCl$_3$ as a solvent. Peaks were observed at δ values, 0.8-1.8 (144H, CO$_2$CH$_2$C$_{17}$H$_{35}$ and C$_{18}$H$_{37}$), 3.5 (4H, CO$_2$CH$_2$C$_{17}$H$_{35}$) and 7.3 (6H, aromatic).

(Thermal analysis)

Figure 11:
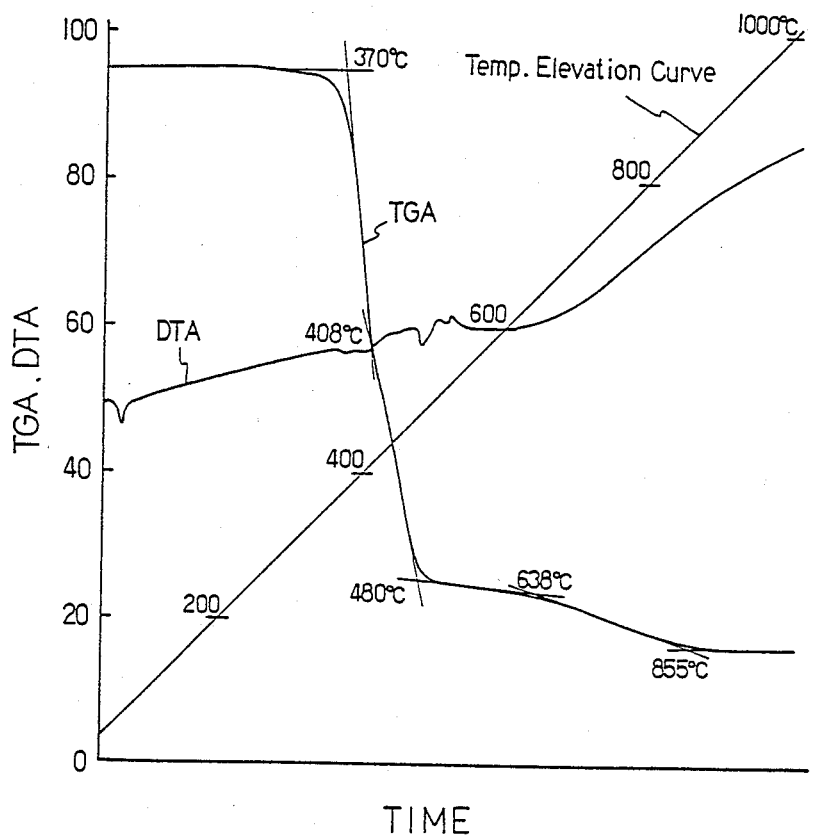

The results are shown in FIG. 11.

In the TGA curve, inflection points are observed at 370° C., 408° C., 480° C., 638° C. and 855° C. In the DTA curve, characteristic peaks other than endothermic peak at about 62° C. are not observed.

The weight decrease which starts from 370° C. and becomes approximately constant at 480° C., approximately agrees to the value calculated supposing that 2 molecules of distearyl ether are eliminated per recurring unit of the precursor. From the above fact and from the fact that the precursor heated at 460° C. for 1 hour showed absorptions at 1,710 cm$^{-1}$ and 1,770 cm$^{-1}$ in the IR spectrum, it was confirmed that the material obtained by the heat treatment was polyimide.

EXAMPLE 9

The LB film-forming properties of the precursor obtained in Example 8 were evaluated in the same manner as in Example 2.

Figure 12:
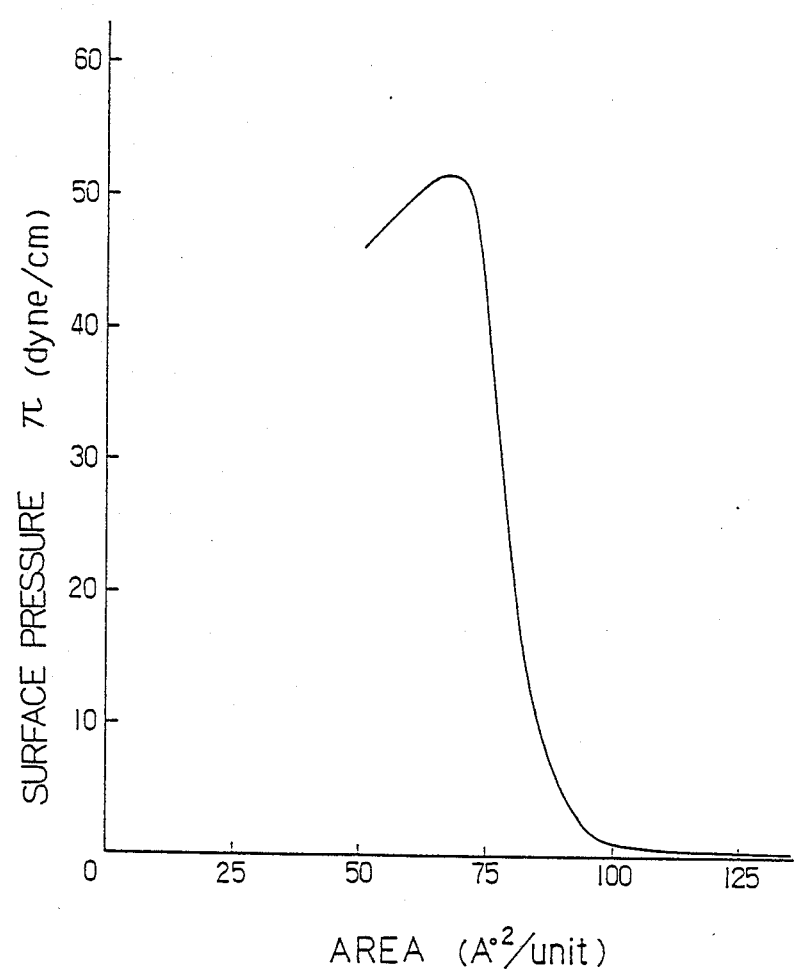

The surface pressure-area curve measured on redistilled water at 20° C. is shown in FIG. 12. The surface pressure suddenly increased from about 100 Å$^2$/unit, and a good condensed monolayer was formed. The limiting area was 85 Å$^2$/unit, and the collapse pressure was about 50 dyne/cm.

A monolayer was formed on redistilled water at 20° C., and a built-up film was formed on an aluminum deposited glass substrate by vertical dipping method at a speed of 10 mm/minute, while maintaining the surface pressure of the monolayer on the water surface at 30 dyne/cm. The built-up film was a Y-type film.

EXAMPLE 10

Synthesis of precursor from distearyl pyromellitate and bis(3-aminopropyl)tetramethyldisiloxane In 50 ml of hexamethylphosphoramide (hexamethylphosphoric triamide) was dissolved 3.80 g of distearyl pyromellitate. To the resulting solution was added dropwise 1.19 g of thionyl chloride at room temperature, and the mixture was further stirred for 1 hour. To the resulting action mixture was added dropwise with stirring at about 5° C. a solution of 1.17 g of bis(3-aminopropyl)tetramethyldisiloxane dissolved in 25 ml of dimethylacetamide. The mixture was further stirred at that temperature for 1 hour and at 40° C. for 30 minutes, and poured into 600 ml of bidistilled water and allowed to stand overnight. The resulting precipitate was filtered, washed with water and methanol in that order and dried to give 3.10 g of light yellow powder (yield: 65% by weight).

The obtained powder was subjected to IR analysis and thermal analysis, and it was confirmed that the product was the objective precursor.

(IR analysis)

Figure 13:
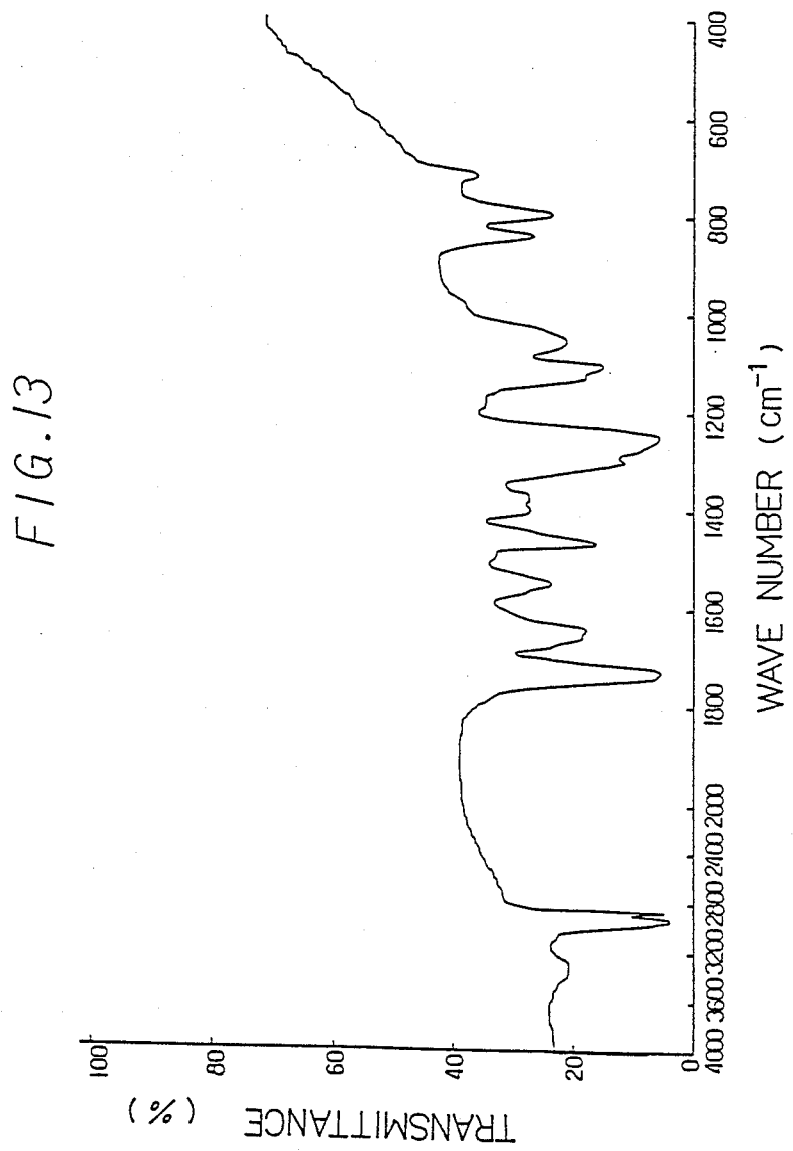
FIGS. 13, 14 and 15 are an infrared absorption spectrum, a graph showing the results of thermal analysis, and a graph showing the relationship between the surface pressure and the area per recurring unit, respectively, with respect to the precursor of the present invention obtained in Example 10 described below.

The IR spectrum is shown in FIG. 13.

Absorptions based on siloxane bond are observed in the neighborhood of 1,050 cm$^{-1}$ and 800 cm$^{-1}$ in addition to characteristic absorptions of ester, amido I, II and III absorption bands and alkyl chain.

(Thermal analysis)

Figure 14:
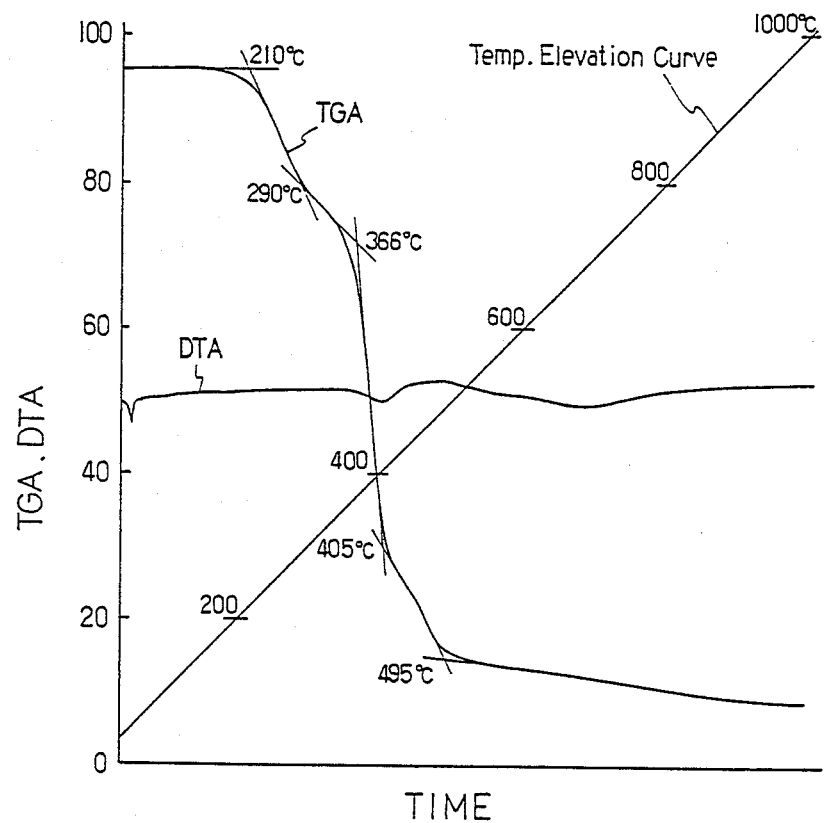

The results are shown in FIG. 14.

In the TGA curve, inflection points are observed at 210° C., 290° C., 366° C., 405° C. and 495° C. In the DTA curve, characteristic peaks other than endothermic peak at about 50° C. are not observed.

The tendency that the weight loss by heating stops as in the polyimide precursor of Example 1 is not seen in the TGA curve of the precursor of this Example. However, when it is maintained at 300° C. for 1 hour, the weight becomes approximately constant, and absorptions are observed at 1,720 cm$^{-1}$ and 1,780 cm$^{-1}$ in the IR spectrum of the so heat treated precursor. From these facts, it is confirmed that the precursor is converted into polyimide.

EXAMPLE 11

The LB film-forming properties of the precursor obtained in Example 10 were evaluated in the same manner as in Example 2.

Figure 15:
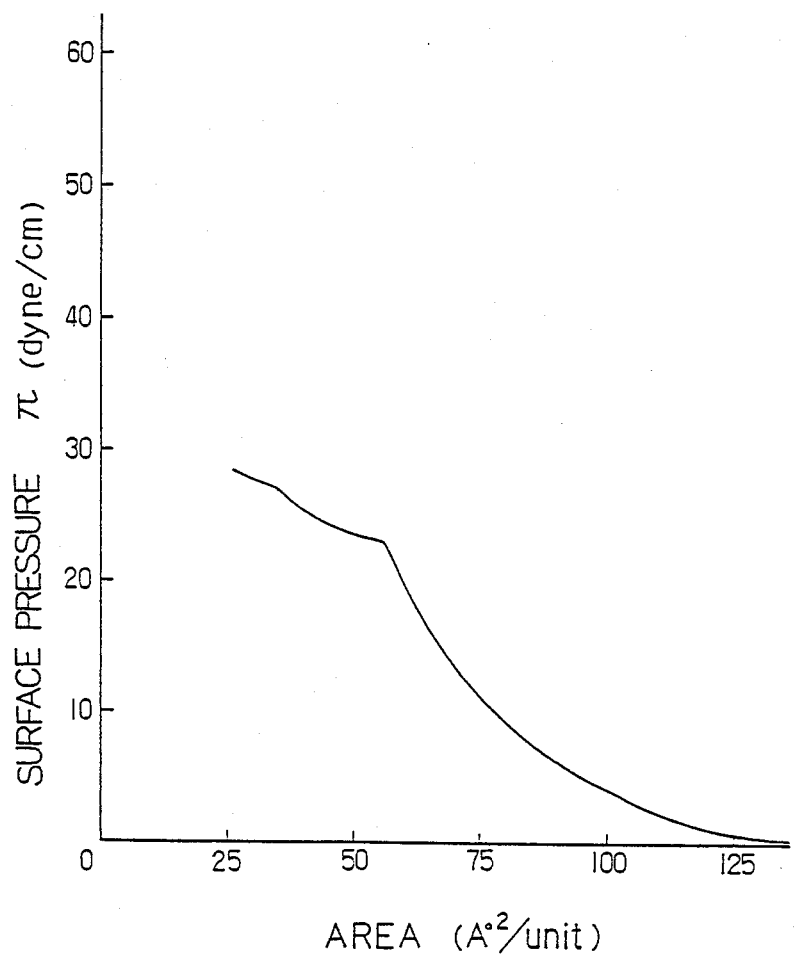

The surface pressure-area curve measured on bidistilled water at 20° C. is shown in FIG. 15. No sudden increase in surface pressure is seen and the monolayer film on the water surface was like a liquid expansion film, but it formed a stable monolayer on the surface of water at 20° C. at the surface pressure of 20 dyne/cm.

A built-up film was formed on an aluminum deposited glass substrate according to the LB method (vertical dipping method) under the conditions of 20 dyne/cm in surface pressure and 10 mm/minute in dipping speed. The built-up multilayer film was a Y-type film.

EXAMPLE 12

Synthesis of precursor from distearyl pyromellitate and hexamethylenediamine

The procedure of Example 10 was repeated except that 3.80 g of distearyl pyromellitate and 0.58 g of hexamethylenediamine, to give 4.0 g of light yellow powder.

The obtained powder was subjected to IR absorption analysis and thermal analysis, and it was confirmed that the product was the objective precursor.

(IR analysis)

Figure 16:
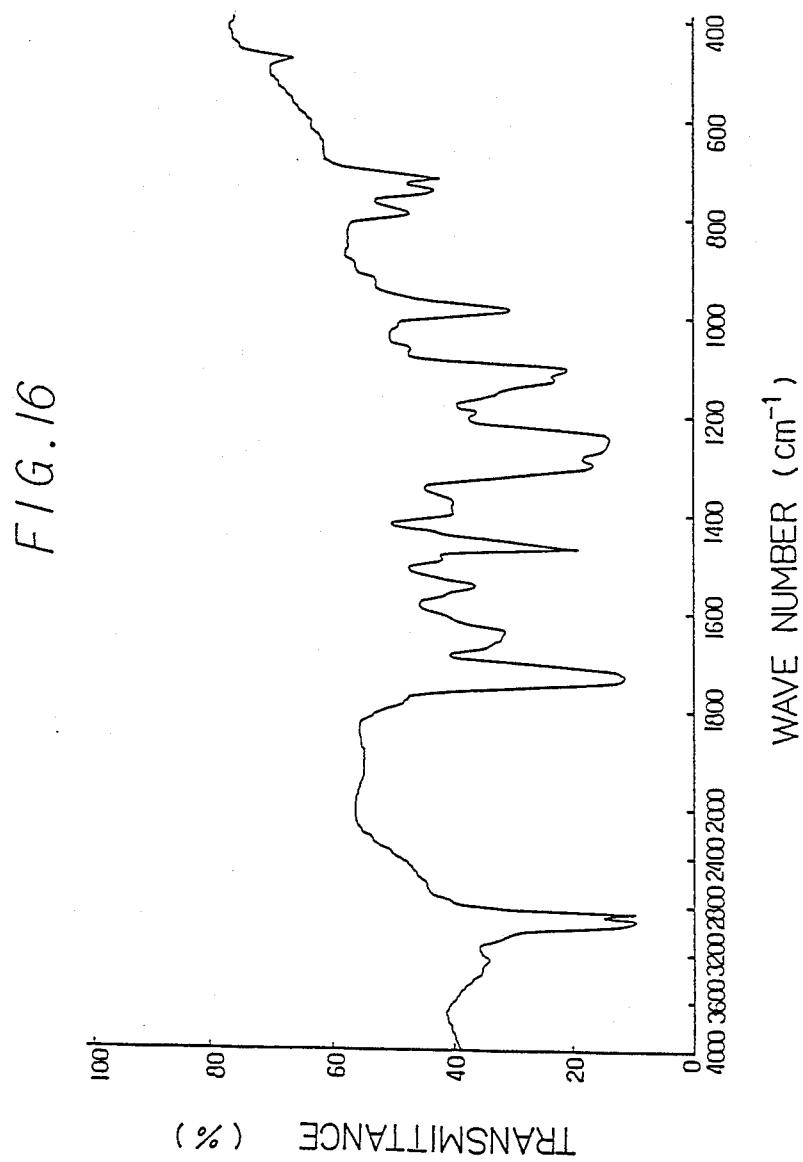
FIGS. 16, 17 and 18 are an infrared absorption spectrum, a graph showing the results of thermal analysis, and a graph showing the relationship between the surface pressure and the area per recurring unit, respectively, with respect to the precursor of the present invention obtained in Example 12 described below.

The IR spectrum is shown in FIG. 16.

Characteristic absorptions of ester, amido I, II and II absorption bands and alkyl chain are observed in the spectrum.

(Thermal analysis)

Figure 17:
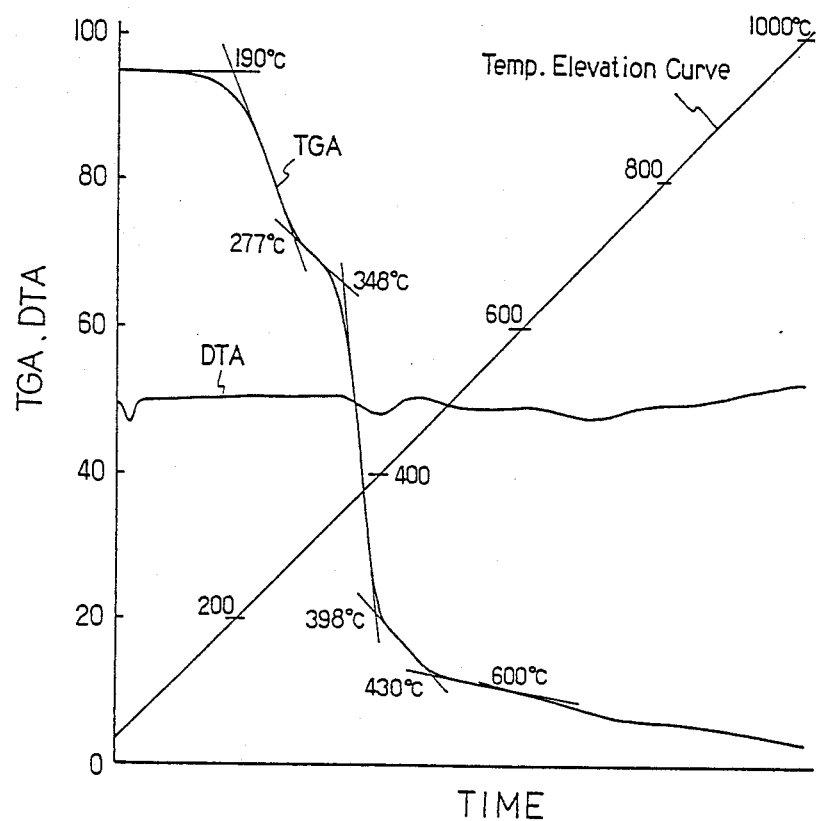

The results are shown in FIG. 17.

In the TGA curve, inflection points are observed at 190° C., 277° C., 348° C., 398° C., 430° C. and 600° C. However, the behavior that the weight loss by heating stops is not seen. The reason is considered to be that since the diamine component is an aliphatic compound, a thermal decomposition reaction proceeds even after imides are formed.

In the DTA curve, endothermic peak is only observed at about 50° C. and no other characteristic peaks are observed.

However, when the precursor is heated at 300° C. for 1 hour, the IR spectrum reveals absorptions at 1,720 and 1,780 cm$^{-1}$ and this result indicates that the precursor is converted into polyimide.

EXAMPLE 13

The LB film-forming properties of the precursor obtained in Example 12 were evaluated according to the procedure of Example 2.

Figure 18:
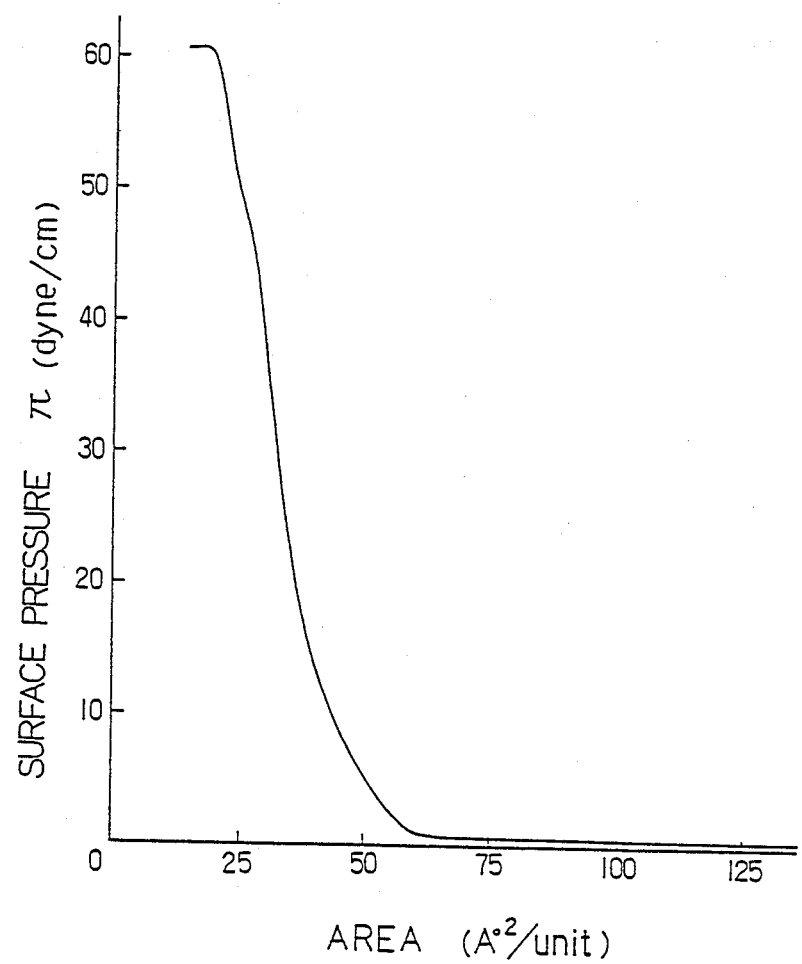

The surface pressure-area curve measured on bidistilled water at 20° C. is shown in FIG. 18. The surface pressure suddenly increased from about 60 Å$^2$/unit, and a good condensed monolayer was formed. The limiting area was 43 Å$^2$/unit.

A monolayer was formed on bidistilled water at 20° C., and a built-up multilayer film was formed on an aluminum deposited glass substrate according to the LB method under the conditions of 25 dyne/cm in surface pressure and 10 mm/minute in dipping speed. The built-up film was a Y-type film.

EXAMPLE 14

A reaction of 10.91 g of pyromellitic dianhydride and 27.05 g of stearyl alcohol was carried out at 120° C. for 3 hours. The resulting product was recrystallized from 200 ml of ethanol to give distearyl pyromellitate having a melting point of 133° to 137° C.

In 60 ml of hexamethylphosphoramide was dissolved 3.79 g (5 millimoles) of distearyl pyromellitate. To the resulting solution cooled to 5° C. was added dropwise 1.19 g of thionyl chloride at about 5° C. After the completion of the addition, the mixture was further maintained for 1 hour with stirring to complete the reaction. To the reaction mixture was added dropwise 1.2 g (6 millimoles) of diaminodiphenyl ether dissolved in 30 ml of dimethylacetamide at about 10° C. The ratio of distearyl pyromellitate to diaminodiphenyl ether was 1:1.2 by mole. The temperature was then raised to about 20° C. and the reaction was continued for 2 hours. The reaction mixture was poured into 400 ml of ethanol to precipitate the product. The precipitate was filtered and dried at 40° C. to give about 3.4 g of light yellow powder.

The results of the IR analysis, thermal analysis and GPC of the powder conducted in the same manner as in Example 1 are as follows:

(IR analysis)

Figure 19:
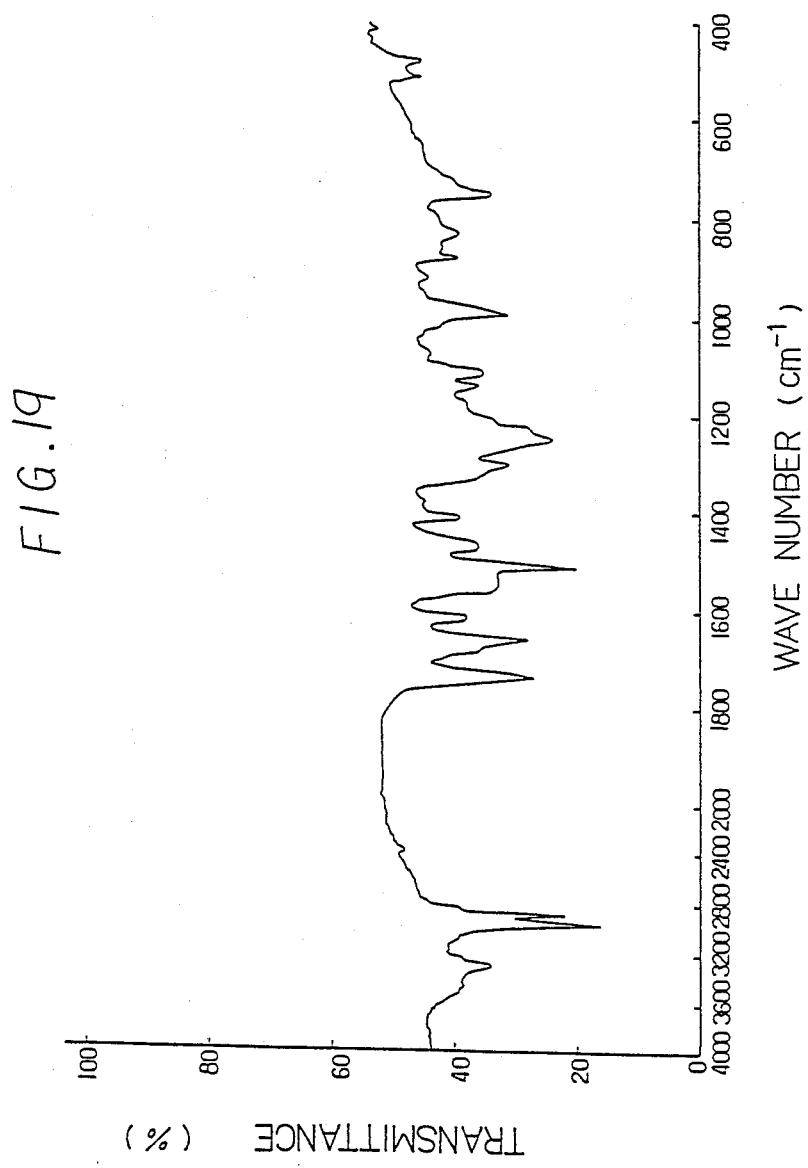
FIGS. 19 and 20 are an infrared absorption spectrum and a graph showing the results of thermal analysis, respectively, with respect to the precursor of the present invention obtained in Example 14 described below.

The IR spectrum is shown in FIG. 19.

Characteristic absorptions of ester, amido I, II and III absorption bands, alkyl chain and ether are observed in the spectrum.

(Thermal analysis)

Figure 20:
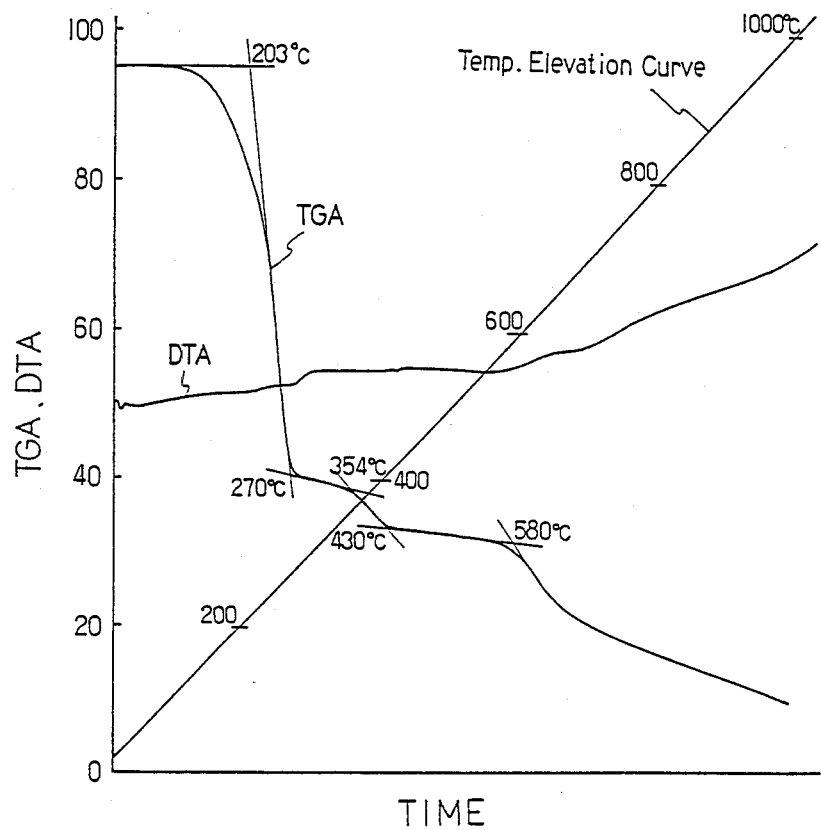

The results are shown in FIG. 20.

In the TGA curve, inflection points are observed at 203° C., 270° C., 354° C., 403° C. and 580° C. No characteristic peak is observed in the TDA curve.

(Measurement of molecular weight by GPC)

The number average molecular weight measured using a chloroform/N,N-dimethylacetamide mixed solvent in a volume ratio of 8/2 was about 15,000 (calculated in terms of polystyrene).

EXAMPLE 15

In a distilled chloroform/dimethylacetamide mixed solvent in a volume ratio of 8/2 was dissolved 55.1 mg of the product obtained in Example 14 to give 25 ml of a solution of the precursor to be used for forming the LB film.

Figure 21:
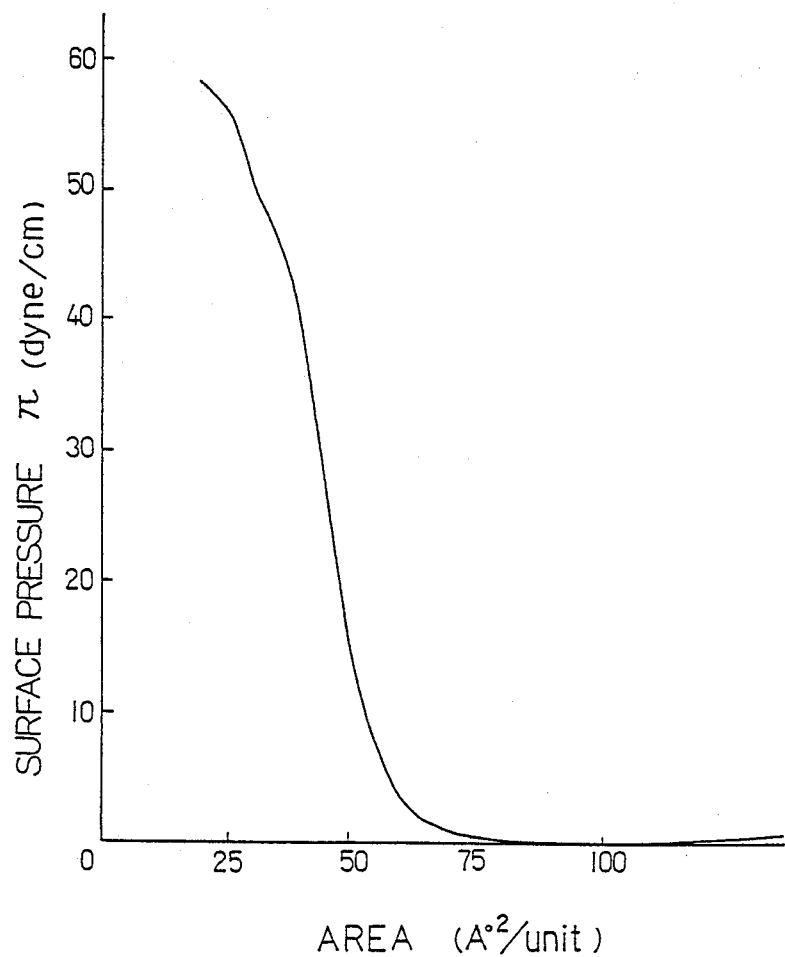
FIG. 21 is a graph showing surface pressure-area curve of the precursor obtained in Example 14.

The obtained solution was spread onto the surface of bidistilled water, and the relationship between the surface pressure and the area for recurring unit was measured at 20° C. The result is shown in FIG. 21. The surface pressure suddenly increased from about 65 Å$^2$/unit and a good condensed monolayer was formed. The limiting area was about 55 Å/unit and the collapse pressure was 45 dyne/cm.

A monolayer was formed on bidistilled water at 20° C., and a multilayer film was formed on an aluminum deposited glass substrate according to the LB method under the conditions of 25 dyne/cm in surface pressure and 10 mm/minute in dipping speed. The obtained film was a good Y-type and a good built-up film.

The built-up film was heated in a nitrogen stream at 400° C. for 1 hour. It was observed by FT-ATR-1R method that the stearyl group disappeared and the absorptions of 5-membered ring imide appeared at 1,790 cm$^{-1}$ and 1,710 cm$^{-1}$.

EXAMPLE 16

Figure 22:
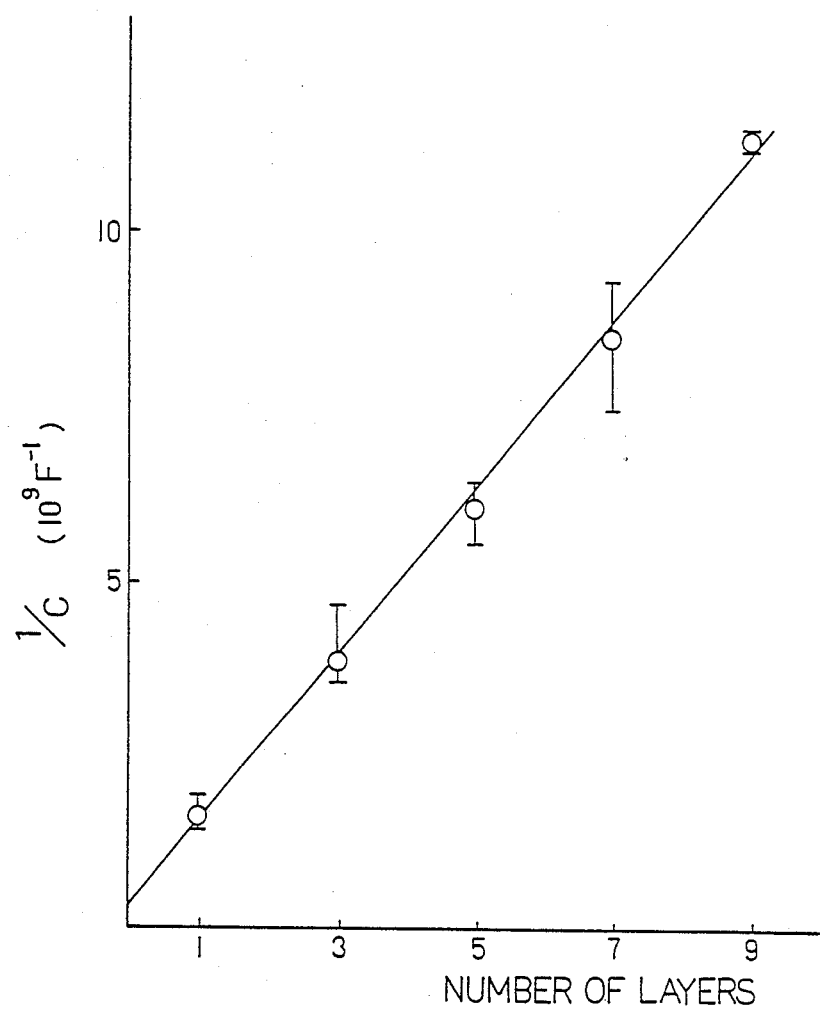
FIG. 22 is a graph showing the relationship between the inverse of the capacitance of a built-up film of the precursor obtained in Example 1 and the number of layers in the built-up film.

Built-up films of 1, 3, 5, 7 and 9 layers of the amphiphilic polyimide precursor were formed on glass substrates each having an aluminum electrode of 0.5 mm in width by using the precursor obtained in Example 1 in the same manner as in Example 2. The films deposited were dried overnight in a desiccator. Aluminum was then deposited on the surface of the film to form an electrode having a width of 0.1 mm and crossing at right angles with respect to the lower Al electrode. The capacitance was measured at room temperature and at a frequency of 1 KHz, and the inverse capacitance values (1/C) were plotted with respect to the number of layers. The result is shown in FIG. 22 wherein bars indicate the distribution of 10 data.

The loss factor of the monolayer film was about 0.20, but the loss factors of the multilayer films having 5 or more layers were not more than 0.02 and these films showed a good performance.

Figure 23:
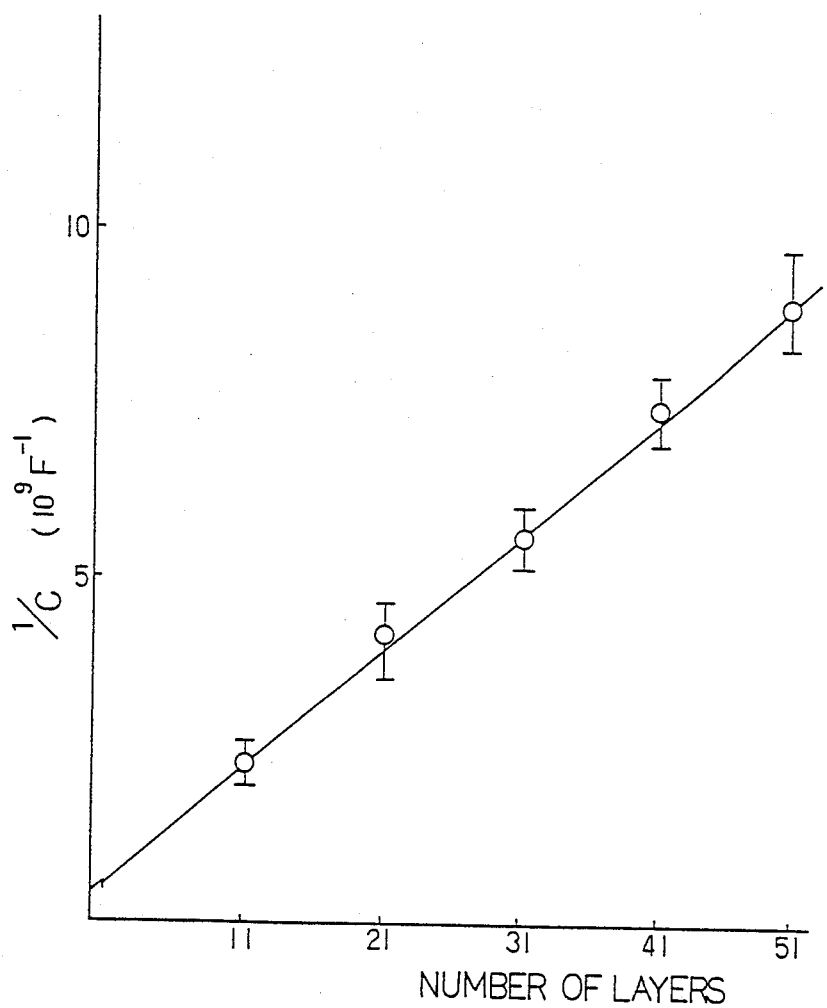
FIG. 23 is a graph showing the relationship between the inverse of the capacitance of a polyimide thin film prepared from a built-up film of the precursor obtained in Example 14 and the number of layers in the built-up film.

Built-up films of 11, 21, 31, 41 and 51 layers were formed on glass substrates having an aluminum electrode of 0.5 mm in width in the same manner as above. After drying overnight, the films were treated in a nitrogen stream at 400° C. for 1 hours. Aluminum was then deposited on the films to form an electrode having a width of 0.1 mm and crossing at right angles with respect to the lower aluminum electrode, and the capacitance was measured at room temperature and at a frequency of 1 KHz. The inverse capacitance values were plotted with respect to the number of layers. The result is shown in FIG. 23 wherein bars indicate the distribution of 10 data.

Also, Al/polyimide thin film/Al devices having a device area of 0.18 cm$^2$ were prepared by forming built-up films of 11, 21, 31, 51, 101 and 151 layers of the precursor of Example 1 on an aluminum electrodes, heating the films in a nitrogen stream at 400° C. for 1 hour to convert the precursor into polyimide and forming an upper aluminum electrode on each of the films. The thicknesses of the respective polyimide films were about 50, 100, 150, 200, 250, 500 and 750 angstroms.

With respect to 10 samples of each device, there were applied electric fields of $1 \times 10^6$ V/cm, $2 \times 10^6$ V/cm, $3 \times 10^6$ V/cm, $4 \times 10^6$ V/em and $5 \times 10^6$ V/cm, but no dielectric breakdown occurred. The results reveal that the polyimide thin films prepared according to the present invention have dielectric strengths of not less than $1 \times 10^6$ V/cm.

EXAMPLES 17 AND 18

Polyimide precursors were prepared in the same manner as in Example 1 except that 1-eicosanol having 20 carbon atoms (Example 17) and 1-docosanol having 22 carbon atoms (Example 18) were used instead of stearyl alcohol.

In both cases, similar surface pressure-area curves to that obtained for the $C_{18}$ alcohol are obtained, and a stable condensed monolayer was formed. Also, good built-up films were obtained from these pecursors by the LB method. The thermal behavior of these precursors were similar to that for the $C_{18}$ alcohol. Elimination of alcohol and conversion into polyimide proceeded by heating, thus the precursors converted into polyimide.

EXAMPLE 19

N,N'-distearyl-p-phenylenediamine was prepared in the same manner as in Example 8. To a solution of 1.53 g (2.50 millimoles) of N,N'-distearyl-p-phenylenediamine dissolved in 30 ml of hexamethylphosphoramide was added dropwise at a temperature of about 40° to 50° C. a solution of 0.545 g (2.50 millimoles) of pyromellitic dianhydride dissolved in 25 ml of dimethylacetamide, and the reaction was further continued for 1 hour.

To the resulting reaction mixture was added a chloroform/dimethylacetamide mixed solvent (8/2 by volume) to prepare a $2 \times 10^{-3}$M solution.

The solution was spread onto the surface of bidistilled water at 20° C., and the surface pressure-area curve was measured. A stable condensed monolayer was formed, and the limiting area was about 80 Å$^2$/unit.

A built-up film was formed on an aluminum deposited glass substrate according to the LB method at a speed of 10 mm/minute, while maintaining the surface pressure of the monolayer on the water surface at 25 dyne/cm at 20° C. The obtained film was a Y-type and a good built-up film.

Also, it was confirmed by IR spectrophotometry that the precursor was converted into polyimide by heating.

EXAMPLE 20

To a solution of 0.775 g (2.50 millimoles) of diethyl pyromellitate dissolved in 25 ml of hexamethylphosphoramide was added dropwise 0.595 g (5.00 millimoles) of thionyl chloride in a nitrogen stream at room temperature, and the reaction was further continued for 1 hour.

Another flask was charged with 1.53 g (2.50 millimoles) of N,N'-distearyl-p-phenylenediamine and 30 ml of hexamethylphosphoramide, and was heated at about 50° C. to dissolve. To the resulting solution was added dropwise the above acid chloride solution, and the reaction was further continued for 1 hour. The reaction mixture was poured into 400 ml of distilled water, and the resulting precipitate was filtered, washed with water and ethanol in that order and dried under reduced pressure to give 1.70 g of a green powder.

The obtained powder was subjected to IR analysis, thermal analysis and GPC, and it was confirmed that the product was the objective polyimide precursor.

(IR analysis)

Figure 24:
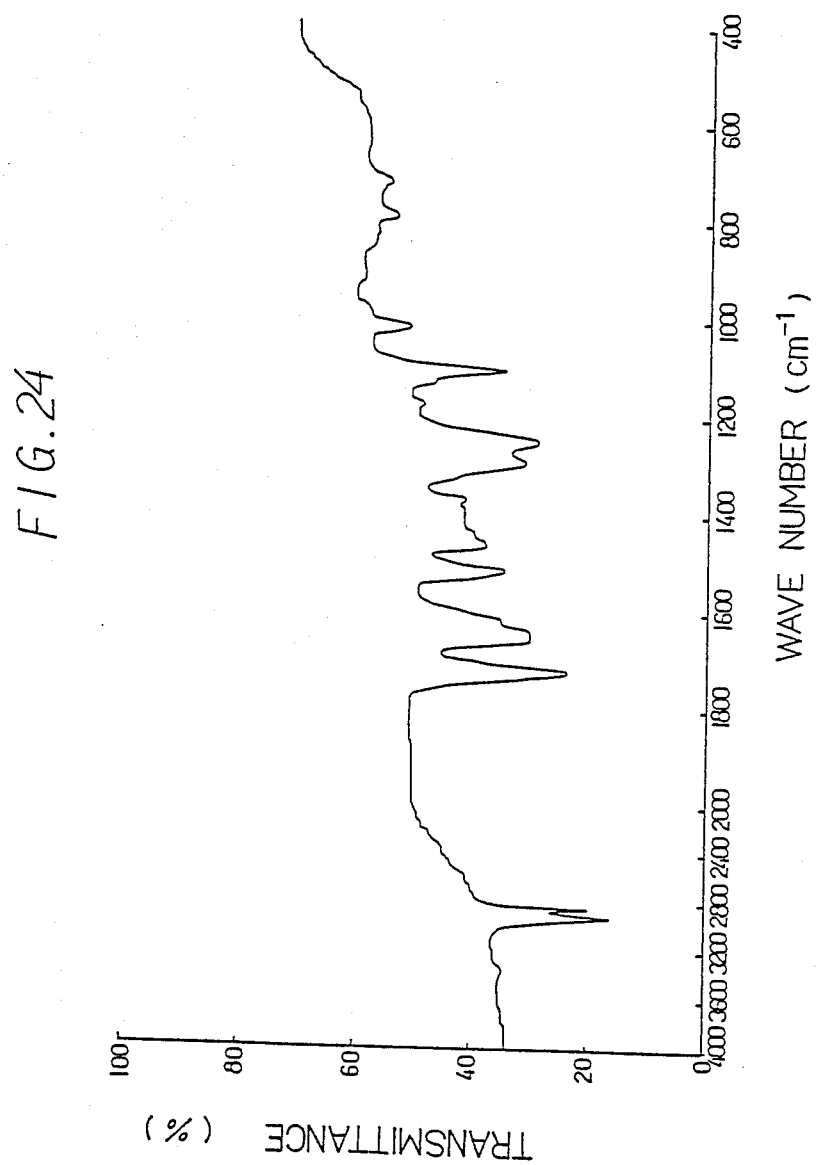
FIG. 24 is an infrared absorption spectrum of the precursor of the present invention obtained in Example 20 described below.

The IR spectrum measured by KBr disc method is shown in FIG. 24.

Characteristic absorptions of ester and alkyl chain are observed in the spectrum like in the cases of Examples 1 and 7, but since the precursor obtained in this Example has no hydrogen of amido group, a strong absorption of amido II absorption band is not observed at 1,550 cm$^{-1}$.

(Thermal analysis)

The analysis was conducted in the same manner as in Example 1. A large weight loss occurred from the inflection point at about 360° C., and the weight became constant at about 450° C. The IR spectrum of the thus heat treated sample revealed characteristic absorptions at 1,720 cm$^{-1}$ and 1,780 cm$^{-1}$, whereby it was confirmed that polyimide was formed.

(Measurement of molecular weight by GPC)

The number average molecular weight measured using N,N'-dimethylacetamide as a solvent was about 15,000 (calculated in terms of polystyrene).

EXAMPLE 21

The surface pressure-area curve was measured on the polyimide precursor obtained in Example 20. A good condensed monolayer was formed on the water surface, and the limiting area was 80 Å$^2$/unit and the collapse pressure was 37 dyne/cm.

A built-up film was formed on an aluminum deposited glass substrate according to the LB method at a dipping speed of 10 mm/minute, while maintaining the surface pressure of the monolyaer on the water surface at 25 dyne/cm at 20° C. The obtained film was a Y-type and a good built-up film.

EXAMPLE 22

Synthesis of distearyl ester of benzophenonetetracarboxylic acid

A 200 ml four necked flask was charged with 10.0 g (0.0311 millimole) of benzophenonetetracarboxylic acid dianhydride and 16.8 g (0.0622 millimole) of stearyl alcohol. The reaction was carried out with stirring in a nitrogen stream at 150° C. for 1 hour. The reaction mixture was cooled to room temperature, dissolved in 150 ml of ethanol and treated with activated carbon. The solution was filtered, and the filtrate was allowed to stand at room temperature to precipitate white crystals. The crystals were filtered and dried to give 18.83 g of the distearyl ester (yield: 70% by weight). Melting point was 46°–49° C. The structure was determined by the IR spectrum.

Synthesis of precursor from distearyl ester of benzophenonetetracarboxylic acid and diaminodiphenyl ether To a 200 ml four necked flask was added 2.50 (2.89 millimoles) of the above distearyl ester, and it was dissolved in dry hexamethylphosphoramide at 40° C. To the flask was added dropwise 0.689 g (5.79 millimoles) of thionyl chloride, and the reaction was further continued with stirring at room temperature for 1 hour. The reaction mixture was cooled to about 5° C., and added dropwise to a solution of 0.578 g (2.89 millimoles) of diaminodiphenyl ether dissolved in 15 ml of dimethylacetamide. After the completion of the addition, the reaction was further continued with stirring at 5° C. for 1 hour, at room temperature for 1 hour and finally at 30° C. for 1 hour. The reaction mixture was a homogeneous reddish orange solution. It was poured into 400 ml of ethanol. The resulting precipitate was filtered, washed with water and ethanol in that order and dried under reduced pressure to give 1.39 g of light mud yellow powder (yield: 47% by weight).

The obtained powder was subjected to IR analysis, thermal analysis and GPC, and it was confirmed that the product was the objective polyimide precursor.

(IR analysis)

Figure 25:
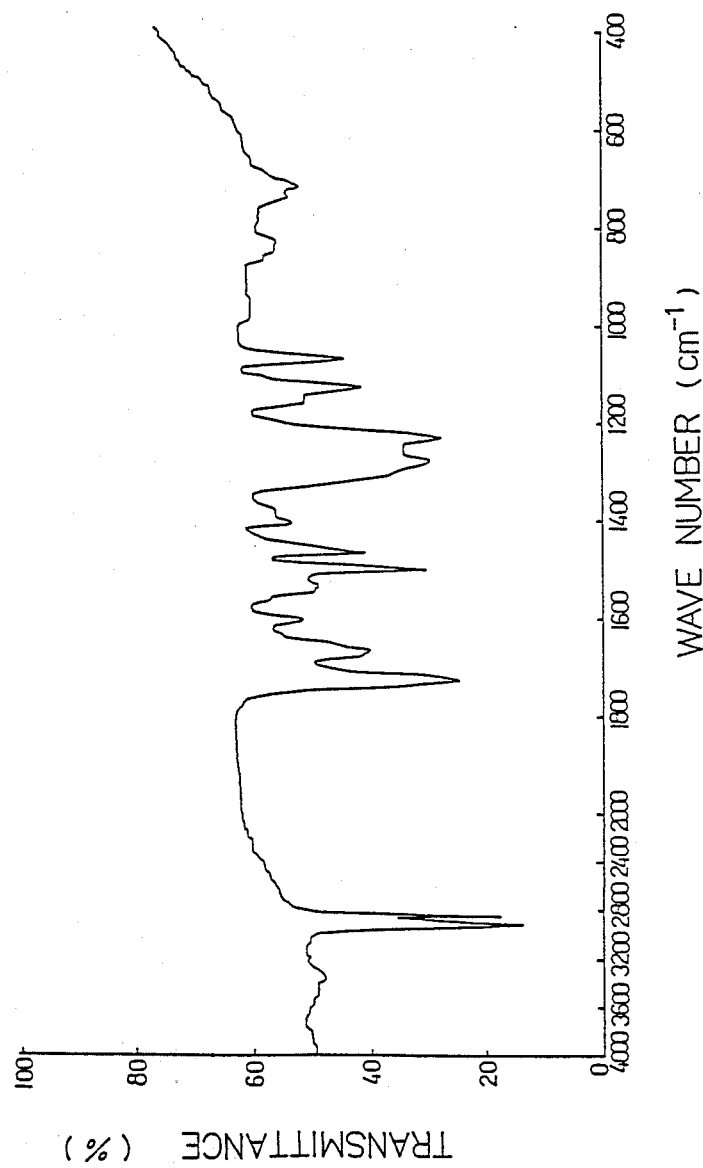
FIG. 25 is an infrared absorption spectrum of the precursor of the present invention obtained in Example 22 described below.

The IR spectrum measured by KBr disc method is shown in FIG. 25.

Characteristic absorptions of easter, amido I, II and III absorption bands, alkyl chain and ether are observed in the spectrum. The absorption of ketone overlaps the absorption of ester.

(Thermal analysis)

In the TGA curve, inflection points were observed at 212° C., 285° C., 366° C., 418° C. and 592° C., but no characteristic peak was observed in the DTA curve.

The TGA curve revealed that the weight became approximately constant at 418° C. By the IR absorption analysis of the so heat treated sample, it was confirmed that polyimide was produced.

(Measurement of molecular weight by GPC)

The number average molecular weight measured using N,N-dimethylacetamide as a solvent was about 25,000 (calculated in terms of polystyrene).

EXAMPLE 23

A solution for use in LB film formation was prepared by dissolving the polyimide precursor obtained in Example 22 in a mixed solvent of distilled chloroform and dimethylacetamide (8/2 by volume).

The solution was spread onto the surface of water, and the surface pressure-area curve was measured. A good monolayer was formed, and the limiting area was 59 Å$^2$/unit and the collapse pressure was 48 dyne/cm.

A monolayer was formed on the surface of water, and a built-up film was formed on an aluminum deposited glass substrate according to the LB method at a dipping speed of 10 mm/minute, while maintaining the surface pressure of the monolayer on the water surface at 20 dyne/cm at 20° C.

EXAMPLE 24

There were reacted 10.91 g of pyromellitic dianhydride and 27.05 g of stearyl alcohol at 120° C. for 3 hours. The product was recrystallized from 200 ml of ethanol to give distearyl pyromellitate having a melting point of 133° C. to 137° C.

In 240 ml of hexamethylphosphoramide was dissolved 15.16 g (20 millimoles) of distearyl pyromellitate. The resulting solution was cooled to 5° C., and thereto added dropwise 4.76 g of thionyl chloride. The reaction was further continued for 1 hour to complete the reaction. To the reaction mixture was added dropwise at 10° C. a solution of 4.0 g (20 millimoles) of diaminodiphenyl ether dissolved in 120 ml of dimethylacetamide. The temperature was then raised to about 20° C., and the reaction was conducted for 2 hours. The reaction mixture was poured into 400 ml of ethanol, and the resulting precipitate was filtered and dried at 40° C. to give about 14.0 g of light yellow powder. In the above procedure, the molar ratio of distearyl pyromellitate to diaminodiphenyl ether was determined at 1/1 as strictly as possible.

The IR analysis, thermal analysis and GPC of the obtained powder were made in the same manner as in Example 1. The results are shown below.

(IR analysis)

The spectrum was similar to that shown in FIG. 19, and showed characteristic absorptions of ester, amido-I, II and III abosrption bands, alkyl chain and ether.

(Thermal analysis)

The results were approximately the same as those shown in FIG. 20. Inflection points were observed at 200° C., 270° C., 353° C., 400° C. and 580° C. in the TGA curve, and no characteristic peaks were observed in the DTA curve.

(Measurement of molecular weight by GPC)

The number average molecular weight measured using a chloroform/N,N-dimethylacetamide mixed solvent (8/2 by volume) was about 95,000 (calculated in terms of polystyrene).

EXAMPLE 25

In a distilled chloroform/dimethylacetamide mixed solvent was dissolved 55.1 mg of the precursor obtained in Example 24 to give 25 ml of a solution for use in LB film formation.

The solution was spread onto the surface of bidistilled water, and the relationship between the surface pressure and the area per recurring unit was measured. The surface pressure-area curve was similar to that shown in FIG. 21. The surface pressure suddenly increased from about 65 Å$^2$/unit, and a good monolayer was formed on the water surface. The limiting area was about 55 Å$^2$/unit and the collapse pressure was 45 dyne/cm.

Also, the built-up film was formed on an aluminum deposited glass substrate by the LB method. The obtained film was a good built-up film.

EXAMPLE 26

A flask was charged with 2.18 g (0.01 mole) of pyromellitic dianhydride and 2.70 g (0.01 mole) of stearyl alcohol, and they were reacted at about 100° C. for 3 hours in a dry nitrogen stream.

The resulting reaction product was dissolved in 40 ml of hexamethylphosphoramide and cooled to 0° to 5° C. To the resulting solution was added dropwise 1.19 g of thionyl chloride at about 5° C. After the completion of the addition, the solution was maintained at about 5° C. for 1 hour to complete the reaction.

To the reaction mixture was then added dropwise 2 g (0.01 mole) of diaminodiphenyl ether dissolved in 50 ml of dimethylacetamide at a temperature of 0° to 5° C., and after the completion of the addition, the reaction was further continued for 1 hour. The reaction mixture was poured into 600 ml of distilled water to precipitate the reaction product. The precipitate was filtered and dried under reduced pressure at about 40° to give about 6 g of a light powder.

IR absorption analysis and measurement of molecular weight by GPC were made.

(IR absorption analysis)

Characteristic absorptions of ester, carboxylic acid, amido I, II and III absorption bands, alkyl chain and ether were observed in the IR spectrum.

(Measurement of molecular weight by GPC)

The number average molecular weight measured using N,N-dimethylacetamide as a solvent was about 30,000 (calculated in terms of standard polystyrene).

EXAMPLE 27

The precursor obtained in Example 26 was dissolved in a distilled chloroform/dimethylacetamide mixed solvent (8/2 by volume) to give 25 ml of a solution for use in LB film formation.

The solution was spread onto the surface of bidistilled water, and a built-up film formed on an aluminum deposited glass substrate according to the LB method, while maintaining the surface pressure of the monolayer on the water surface at 25 dyne/cm at 20° C.

EXAMPLE 28

Al/partial polyimide thin film/Al devices having a device area of 0.18 cm$^2$ were prepared in the same manner as in Example 16 by forming built-up films of 11, 21, 31 and 41 layers and heating at 200° C. for 1 hour in a nitrogen stream.

Figure 26:
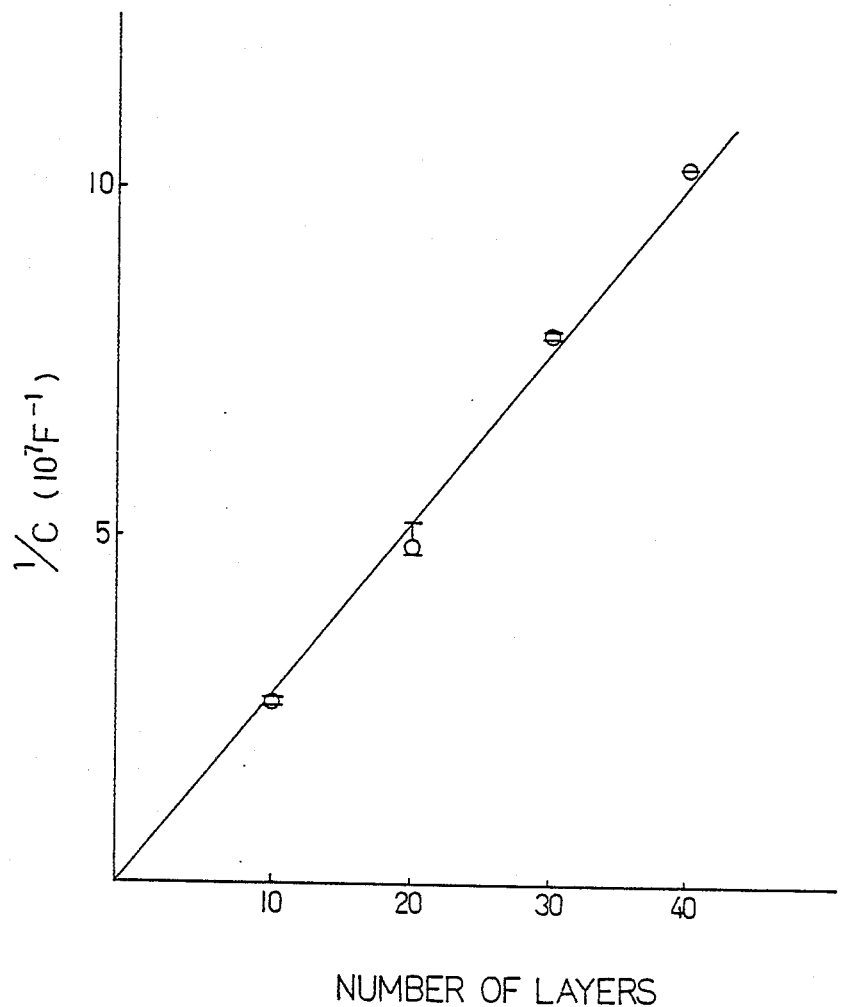
FIG. 26 is a graph showing the relationship between the inverse of the capacitance of a partial polyimide thin film prepared by partially converting the precursor of the invention into polyimide at 200° C. and the number of layers.

The capacitance of the devices was measured at room temperature at a frequency of 1 KHz. The inverse capacitance values (1/C) were plotted with respect to the number of layers. The result is shown in FIG. 26 wherein bars indicate the distribution of 10 data. The loss factor was about 0.01.

Also, electric fields of $1 \times 10^6$, $2 \times 10^6$, $3 \times 10^6$, $4 \times 10^6$ and $5 \times 10^6$ V/cm were applied to the devices, but no dielectric breakdown occurred.

In addition to the ingredients used in the Examples, other ingredients can be used in the Examples as set forth in the specification to obtain substantially the same results.

From the description hereinbefore, it would be understood that the polyimide precursors of the present invention can provide thin films by the LB method, and by heating the obtained LB films of the precursors, there can be obtained polyimide ultrathin films having a thickness of not more than 10,000 Å, and if desired, a thickness of 5 to 1,000 Å, and having good heat resistance and electric characteristics as well as good chemical resistance and mechanical properties.

What we claim is:

1. A thin film made by the Langmuir-Blodgett technique from a polyamide precursor having at least 70% by mole of the recurring unit of the formula (1):

$$\left[ \begin{array}{c} R^3-O-\overset{O}{\underset{\|}{C}} \diagdown \phantom{R^1} \diagup \overset{O}{\underset{\|}{C}}-O-R^4 \\ R^1 \\ -N-\underset{\|}{C} \diagup \phantom{R^1} \diagdown \underset{\|}{C}-N-R^2- \\ \underset{R^5}{|} \phantom{-} \overset{\|}{O} \phantom{xx} \overset{\|}{O} \phantom{-} \underset{R^6}{|} \end{array} \right] \quad (1)$$

wherein $R^1$ is a tetravalent group having at least 2 carbon atoms, $R^2$ is a bivalent group having at least 2 carbon atoms, and each of $R^3$, $R^4$, $R^5$ and $R^6$ is independently a hydrogen atom or a monovalent group having 1 to 30 carbon atoms selected from the group consisting of an aliphatic group, an alicyclic group, an aromatic group, a group in which an aliphatic group is combined with an alicyclic group or an aromatic group, and the above groups substituted by a halogen atom, nitrogen group, amino group, cyano group, methoxy group or acetoxyl group, provided that at least one of $R^3$, $R^4$, $R^5$ and $R^6$ is a hydrophobic monovalent group having 12 to 30 carbon atoms.

2. The thin film of claim 1, wherein at least two of the groups $R^3$, $R^4$, $R^5$ and $R^6$ are hydrophobic monovalent groups having 12 to 30 carbon atoms.

3. The thin film of claim 1, wherein each of the groups $R^3$, $R^4$, $R^5$ and $R^6$ is a hydrogen atom or a monovalent group having 1 to 22 carbon atoms, provided that at least two of them are hydrophobic monovalent groups having 16 to 22 carbon atoms.

4. The thin film of claim 1, wherein at least one of the groups $R^1$ and $R^2$ is a group characterized by benzenoid unsaturation and having at least 6 carbon atoms.

5. The thin film of claim 1, wherein a pair of groups selected from $R^3OCO-$, $R^4OCO-$, $-NR^5CO-$ and $-CONR^6-R^2$ is directly attached to two adjacent carbon atoms in the group $R^1$ so as to form a 5-membered ring after curing of said polyamide precursor.

6. The thin film of claim 1, wherein said recurring unit (1) is represented by the formula (2):

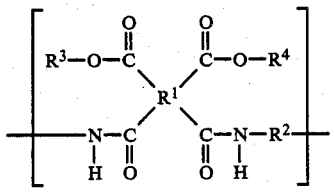
(2)

wherein $R^1$, $R^2$, $R^3$ and $R^4$ are as defined above, provided that $R^3$ and $R^4$ are hydrophobic monovalent groups having 12 to 30 carbon atoms.

7. The thin film of claim 1, wherein the recurring unit (1) is represented by the formula (3):

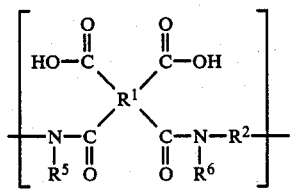
(3)

wherein $R^1$, $R^2$, $R^5$ and $R^6$ are as defined above, provided that $R^5$ and $R^6$ are hydrophobic monovalent groups having 12 to 30 carbon atoms.

8. The thin film of claim 1 wherein the polyimide precursor is partially converted into polyimide.

9. The thin film of claim 8, which has a dielectric strength of not less than $1 \times 10^6$ V/cm.

10. The thin film of claim 8, which has a dielectric strength of not less than $1 \times 10^6$ V/cm and a heat resistance of not lower than 200° C.

11. The thin film of claim 8, wherein said thin film is formed by building up layers of said polyimide precursor onto a substrate by the Langmuir-Blodgett technique and partially converting said polyimide precursor into polyimide.

12. The thin film of claim 1, which is a monomolecular film.

13. The thin film of claim 1, which is a built-up film comprising at least two monomolecular layers.

14. A thin film of a polyimide made from a polyimide precursor by forming a film of said precursor by the Langmuir-Blodgett technique and converting said precursor into polyimide, said precursor having at least 70% by mole of the recurring unit of the formula (1):

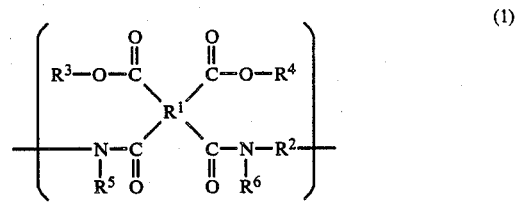
(1)

wherein $R^1$ is a tetravalent group having at least 2 carbon atoms, $R^2$ is a bivalent group having at least 2 carbon atoms, and each of $R^3$, $R^4$, $R^5$ and $R^6$ is independently a hydrogen atom or a monovalent group having 1 to 30 carbon atoms selected from the group consisting of an aliphatic group, an alicyclic group, an aromatic group, a group in which an aliphatic group is combined with an alicyclic group or an aromatic group, and the above groups substituted by a halogen atom, nitro group, amino group, cyano group, methoxy group or acetoxyl group, provided that at least one of $R^3$, $R^4$, $R^5$ and $R^6$ is a hydrophobic monovalent group having 12 to 30 carbon atoms.

15. The thin film of claim 14, wherein at least two of the groups $R^3$, $R^4$, $R^5$ and $R^6$ are hydrophobic monovalent groups having 12 to 30 carbon atoms.

16. The thin film of claim 14, wherein each of the groups $R^3$, $R^4$, $R^5$ and $R^6$ is a hydrogen atom or a monovalent group having 1 to 22 carbon atoms, provided that at least two of them are hydrophobic monovalent groups having 16 to 22 carbon atoms.

17. The thin film of claim 14, wherein at least one of the groups $R^1$ and $R^2$ is a group characterized by benzenoid unsaturation and has at least 6 carbon atoms.

18. The thin film of claim 14, having a thickness of not more than 1,000 Å and a dielectric strength of not less than $1 \times 10^6$ V/cm.

19. The thin film of claim 14, which has a heat resistance of not lower than 400° C.

20. The thin film of claim 14, wherein said thin film is formed by building up layers of the polyimide precursor onto a substrate according to the Langmuir-Blodgett technique and converting said precursor into polyimide.

* * * * *

UNITED STATES PATENT AND TRADEMARK OFFICE
CERTIFICATE OF CORRECTION

PATENT NO. : 4,822,853
DATED : April 18, 1989
INVENTOR(S) : UEKITA et al

It is certified that error appears in the above-identified patent and that said Letters Patent is hereby corrected as shown below:

Column 1, line 10, "processor" should read --process--.
Column 2, line 18, "aliphatic" should read --alicyclic--.
Column 38, line 48, "polyamide" should read --polyimide--;
          line 68, "nitrogen" should read --nitro--.
Column 39, line 21, "polyamide" should read --polyimide--.

Signed and Sealed this

Twenty-seventh Day of March, 1990

*Attest:*

JEFFREY M. SAMUELS

*Attesting Officer*      *Acting Commissioner of Patents and Trademarks*